United States Patent
Banno et al.

(10) Patent No.: US 11,220,274 B2
(45) Date of Patent: Jan. 11, 2022

(54) VEHICLE DISPLAY CONTROL DEVICE

(71) Applicant: DENSO CORPORATION, Kariya (JP)

(72) Inventors: Hiroto Banno, Kariya (JP); Takeshi Hato, Kariya (JP); Takeshi Kawashima, Kariya (JP); Daisuke Takemori, Kariya (JP); Akira Kamiya, Kariya (JP); Shingo Yamashita, Kariya (JP); Yasushi Sakuma, Kariya (JP); Satoshi Horihata, Kariya (JP)

(73) Assignee: DENSO CORPORATION, Kariya (JP)

( * ) Notice: Subject to any disclaimer, the term of this patent is extended or adjusted under 35 U.S.C. 154(b) by 211 days.

(21) Appl. No.: 16/532,627

(22) Filed: Aug. 6, 2019

(65) Prior Publication Data
US 2019/0359228 A1 Nov. 28, 2019

Related U.S. Application Data

(63) Continuation of application No. PCT/JP2018/001849, filed on Jan. 23, 2018.

(30) Foreign Application Priority Data

Feb. 8, 2017 (JP) .............................. JP2017-021509
Dec. 20, 2017 (JP) .............................. JP2017-243498

(51) Int. Cl.
*B60W 50/14* (2020.01)
*B60K 35/00* (2006.01)
*B60W 40/072* (2012.01)

(52) U.S. Cl.
CPC ............. *B60W 50/14* (2013.01); *B60K 35/00* (2013.01); *B60W 40/072* (2013.01);
(Continued)

(58) Field of Classification Search
CPC ............... B60W 50/14; B60W 40/072; B60W 2050/146; B60K 35/00; B60K 2370/1529; B60K 2370/334
See application file for complete search history.

(56) References Cited

U.S. PATENT DOCUMENTS 9,530,211 B2 * 12/2016 Mochizuki ............. G02B 27/01
2005/0062848 A1 * 3/2005 Satou ....................... H04N 7/18
348/115
(Continued)

FOREIGN PATENT DOCUMENTS

JP    2005145434 A    6/2005
JP    2006242859 A    9/2006
(Continued)

*Primary Examiner* — Chico A Foxx
(74) *Attorney, Agent, or Firm* — Harness, Dickey & Pierce, P.L.C.

(57) ABSTRACT

A vehicle display control device controls display performed by a head-up display for a vehicle. The head-up display is configured to project an image on a projection member to cause a virtual image to be displayed in superimposed relation on a front view of the vehicle. The vehicle display control device determines a host vehicle situation as a road structure of a road on which a host vehicle is running, and controls to limit or not to limit a superimposed display of the virtual image with respect to a target object on which the virtual image is to be displayed in superimposed relation according to the host vehicle situation determined.

14 Claims, 18 Drawing Sheets

(52) U.S. Cl.
CPC ............... *B60K 2370/1529* (2019.05); *B60K 2370/334* (2019.05); *B60W 2050/146* (2013.01)

(56) References Cited

U.S. PATENT DOCUMENTS

| | | | |
|---|---|---|---|
| 2008/0055192 A1 | 3/2008 | Nagano et al. | |
| 2012/0268351 A1 | 10/2012 | Sasaki et al. | |
| 2013/0131925 A1* | 5/2013 | Isaji | B60W 30/16 701/41 |
| 2013/0144521 A1* | 6/2013 | Mathieu | G06K 9/00832 701/410 |
| 2015/0084988 A1* | 3/2015 | Lee | B60W 40/072 345/633 |
| 2015/0221220 A1* | 8/2015 | Arai | G08G 1/09 340/907 |
| 2016/0207399 A1* | 7/2016 | Ogasawara | B60K 35/00 |
| 2016/0311323 A1* | 10/2016 | Lee | B60K 35/00 |
| 2016/0327402 A1 | 11/2016 | Funabiki et al. | |
| 2017/0085847 A1* | 3/2017 | Kurosawa | B60K 35/00 |
| 2017/0256167 A1* | 9/2017 | Kim | G08G 1/166 |
| 2018/0023970 A1* | 1/2018 | Iguchi | G08G 1/096861 345/7 |
| 2018/0090007 A1 | 3/2018 | Takemori et al. | |
| 2018/0174463 A1* | 6/2018 | Ohta | G08G 1/166 |
| 2018/0211635 A1* | 7/2018 | Ishibashi | G02B 27/0101 |
| 2018/0224295 A1* | 8/2018 | Nakajima | B60R 11/04 |
| 2018/0306597 A1* | 10/2018 | Kosaka | G09G 5/377 |
| 2018/0356641 A1* | 12/2018 | Morohashi | B60K 35/00 |
| 2018/0370567 A1* | 12/2018 | Rowell | G06T 19/006 |
| 2018/0373030 A1* | 12/2018 | Kusanagi | B60R 11/04 |
| 2019/0063942 A1* | 2/2019 | Kang | G05D 1/0223 |
| 2019/0139286 A1* | 5/2019 | Shimoda | B60K 35/00 |
| 2019/0143816 A1* | 5/2019 | Wakatsuki | G02B 27/0179 345/632 |
| 2019/0317600 A1* | 10/2019 | White | G01C 21/365 |
| 2020/0064629 A1* | 2/2020 | Yamashita | G06F 3/1446 |
| 2020/0400455 A1* | 12/2020 | Wakayanagi | G06T 19/00 |

FOREIGN PATENT DOCUMENTS

| | | |
|---|---|---|
| JP | 2008030729 A | 2/2008 |
| JP | 2011121401 A | 6/2011 |
| JP | 2014213763 A | 11/2014 |
| JP | 2015104930 A | 6/2015 |
| JP | 2016172469 A | 9/2016 |
| JP | 2016172480 A | 9/2016 |
| JP | 2017211370 A * | 11/2017 |
| WO | WO-2015118859 A1 | 8/2015 |

* cited by examiner

VEHICLE DISPLAY CONTROL DEVICE

CROSS REFERENCE TO RELATED APPLICATIONS

The present application is a continuation application of International Patent Application No. PCT/JP2018/001849 filed on Jan. 23, 2018, which designated the U.S. and claims the benefit of priority from Japanese Patent Application No. 2017-21509 filed on Feb. 8, 2017 and Japanese Patent Application No. 2017-243498 filed on Dec. 20, 2017. The entire disclosures of all of the above applications are incorporated herein by reference.

TECHNICAL FIELD

The present disclosure relates to a vehicle display control device.

BACKGROUND

As an example of a vehicle display control device, there is a control device to control a head-up display (hereinafter referred to as HUD) which projects an image onto a projection member such as a front windshield to allow a virtual image to be displayed in superimposed relation on a front view of a vehicle.

SUMMARY

The present disclosure provides a vehicle display control device configured to control display performed by a head-up display for a vehicle. The head-up display is configured to project an image on a projection member to cause a virtual image to be displayed in superimposed relation on a front view of the vehicle. The vehicle display control device determines a host vehicle situation as a road structure of a road on which a host vehicle is running, and controls to limit or not to limit a superimposed display of the virtual image according to the host vehicle situation.

BRIEF DESCRIPTION OF DRAWINGS

The above and other objects, features and advantages of the present disclosure will become more apparent from the following detailed description made with reference to the accompanying drawings, in which.

DETAILED DESCRIPTION

Figure 1:
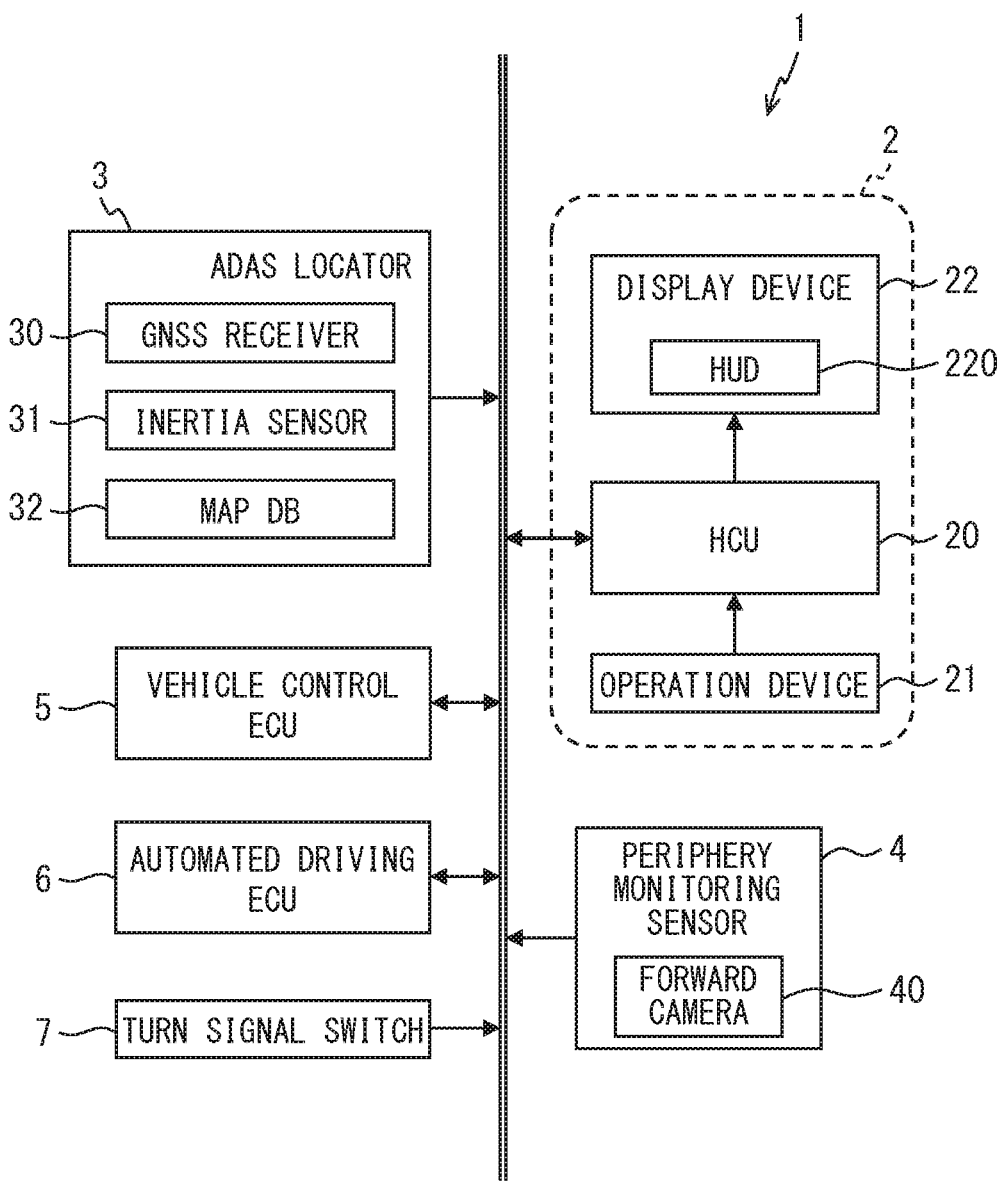
FIG. 1 is a diagram illustrating an example of a schematic configuration of a vehicle system.

There is a head-up display (hereinafter referred to as HUD) which projects an image onto a projection member such as a front windshield to allow a virtual image to be displayed in superimposed relation on a front view of a vehicle. There is a technique which causes the HUD to display a virtual image along a shape of a lane scheduled to be followed by a host vehicle in superimposed relation on the lane in a front view and thus allows a driver to recognize the lane scheduled to be followed by the host vehicle and assists the driver. Also, there is also a technique which causes the HUD to display a virtual image representing information of a road sign along a road on which a host vehicle is running in superimposed relation on a front view of the vehicle and thus assists the driver.

However, when the virtual image (hereinafter referred to as a route virtual image) along the shape of the lane scheduled to be followed by the host vehicle is intended to be displayed in superimposed relation on the lane in the front view, due to a limited range in which an image can be projected, the display of the route virtual image may give an odd feeling to the driver and cause the driver to feel annoyed. Specifically, while the host vehicle is turning a curve, the driver encounters a situation in which a part of the lane scheduled to be followed by the host vehicle which is more distant from the host vehicle is deviated leftward or rightward from the front of a driver seat to look curved. In such a situation, when the range in which the image can be projected is limited to the front of the driver seat, even when the route virtual image is intended to be displayed in superimposed relation on the front view, the displayed route virtual image may have a significantly large missing portion corresponding to the part of the lane deviated leftward or rightward from the front of the driver seat. When the driver sees the display of the route virtual image having such a significantly large missing portion, the driver may feel annoyed. Not only while the host vehicle is turning a curve, but also while the gradient of the lane is changing, the same situation may be encountered.

While the gradient of the lane is changing, even when the area on which the route virtual image is displayed in superimposed region falls within the range in which the image can be projected, the display of the route virtual image may give an odd feeling to the driver and cause the driver to feel annoyed. Specifically, when the route ahead of the host vehicle has a section in which the gradient of the lane decreases, depending on the degree to which the gradient of the lane decreases, a blind spot which cannot be visually recognized by the driver is formed on a road surface at a descending gradient. In such a situation, when the route virtual image along even a shape of the road surface corresponding to the blind spot of the driver is displayed in superimposed relation on the front view, the resulting display significantly differs from the shape of the road surface visually recognized by the driver, which may cause the driver to feel annoyed.

There is another case where a virtual image representing information of a road sign along a road on which a host vehicle is running is displayed in superimposed relation on the front view of a vehicle. In such a case, when a driver sees, each time a road sign appears in front of the host vehicle, a virtual image representing the road sign, the driver may feel annoyed.

In an embodiment of the present disclosure, a vehicle display control device is configured to control display performed by a head-up display for a vehicle. The head-up display is configured to project an image on a projection member and thus cause a virtual image to be displayed in superimposed relation on a front view of the vehicle. The vehicle display control device includes a situation determining part and a display control part. The situation determining part determines a host vehicle situation as a road structure of a road on which a host vehicle is running. The display control part selectively limits or does not limit a superimposed display of the virtual image with respect to the same target object serving as a target object on which the virtual image is to be displayed in superimposed relation depending on the host vehicle situation determined by the situation determining part.

Such configuration allows the superimposed display of the virtual image with respect to the same target object on which the virtual image is to be displayed in superimposed relation in the front view to be selectively limited or unlimited based on the host vehicle situation as the road structure of the road on which the host vehicle is running. Consequently, it is possible to limit the superimposed display of the virtual image with respect to the target object in a situation in which a driver may feel annoyed by the road structure of the road on which the host vehicle is running. Accordingly, in a case of a situation in which the superimposed display of the virtual image is conceivably less necessary for the driver, it is possible to limit the superimposed display of the virtual image with respect to the target object. As a result, it is possible to assist the driver by displaying the virtual image in superimposed relation on the front view of the vehicle and also reduce annoyance caused in the driver by displaying the virtual image in superimposed relation.

In an embodiment of the present disclosure, a vehicle display control device is configured to control display performed by a head-up display for a vehicle. The head-up display is configured to project an image on a projection member and thus cause a virtual image to be displayed in superimposed relation on a front view of the vehicle. The vehicle display control device includes a situation determining part and a display control part. The situation determining part determines a host vehicle situation, which is at least either a situation in which a target information source as a road sign or a road marking ahead of the host vehicle on a route is less recognizable by a driver or a situation in which the target information source as the road sign or the road marking ahead of the host vehicle on the route is presumed to be overlooked by the driver. The display control part does not limit superimposed display of a virtual image representing the target information source on the front view, when the situation determining part determines that the host vehicle situation is either the situation in which the target information source as the road sign or the road marking ahead of the host vehicle on the route is less recognizable by the driver or the situation in which the target information source as the road sign or the road marking ahead of the host vehicle on the road is presumed to be overlooked by the driver. On the other hand, the display control part limits the superimposed display of the virtual image representing the target information source on the front view when the situation determining part determines that the host vehicle situation is neither of the situations shown above.

Such configuration allows the superimposed display of the virtual image with respect to the same target object on which the virtual image is to be displayed in superimposed relation on the front view to be selectively limited or unlimited based on the host vehicle situation, which is either the situation in which the target information source is less recognizable by the driver or the situation in which the target information source is presumed to be overlooked by the driver. Consequently, it is possible to limit the superimposed display of the virtual image with respect to the target object in at least either the situation in which the target information source is recognizable by the driver or the situation in which the target information source is not presumed to be overlooked by the driver. Accordingly, in a case of a situation in which the superimposed display of the virtual image is conceivably less necessary for the driver, it is possible to limit the superimposed display of the virtual image with respect to the target object. As a result, it is possible to assist the driver by displaying the virtual image in superimposed relation on the front view of the vehicle and also reduce annoyance caused in the driver by displaying the virtual image in superimposed relation.

Referring to the drawings, embodiments and modifications of the present disclosure will be further described. For descriptive convenience, in the plurality of embodiments and modifications, parts having the same functions as those of the parts shown in the drawings used for the description given hitherto are given the same reference numerals, and a description thereof may be omitted. For the parts given the same reference numerals, the description in the other embodiments and modifications can be referred to.

First Embodiment

<Schematic Configuration of Vehicle System 1>

The following will describe the first embodiment with reference to the drawings. A vehicle system 1 shown in FIG. 1 is for use in a vehicle such as an automobile and includes a HMI (Human Machine Interface) system 2, an ADAS (Advanced Driver Assistance Systems) locator 3, a periphery monitoring sensor 4, a vehicle control ECU 5, an automated driving ECU 6, and a turn signal switch 7. It is assumed that the HMI system 2, the ADAS locator 3, the periphery monitoring sensor 4, the vehicle control ECU 5, the automated driving ECU 6, and the turn signal switch 7 are connected to, e.g., an in-vehicle LAN. A vehicle using the vehicle system 1 is hereinafter referred to as a host vehicle.

The ADAS locator 3 includes a GNSS (Global Navigation Satellite System) receiver 30, an inertia sensor 31, and a map database (hereinafter referred to as map DB) 32 storing map data. The GNSS receiver 30 receives positioning signals from a plurality of artificial satellites. The inertia sensor 31 includes, e.g., a triaxial gyro sensor and a triaxial acceleration sensor. The map DB 32 is a nonvolatile memory and stores map data such as link data, segment data, node data, and road shape data.

The link data includes individual data items such as a link ID specifying each of links, a link length showing a length of the link, a link orientation, a link travel time, node coordinates of a start point and an end point of the link, and a road attribute. The segment data is data for each of segments obtained by dividing the link with shape points and includes a segment ID specifying the segment, a segment length showing a length of the segment, a curvature of the segment, and shape point IDs at the both ends of the segment. The node data includes individual data items such as a node ID as a specific number given to each of nodes on a map, node coordinates, a node name, a node type, a connected link ID having the link ID of the link connected to the node, and an intersection type. It is assumed that road shape data includes data items such as a longitudinal gradient and a curvature. It may also be possible to use a configuration using, as the map data, three-dimensional map data including data items such as a geographical feature, structures including road signs, and road markings. The configuration may also be such that the map data is obtained from outside the host vehicle using an in-vehicle communication module mounted in the host vehicle.

The ADAS locator 3 combines the positioning signals received by the GNSS receiver 30 and a measurement result from the inertia sensor 31 to sequentially determine a vehicle position of the host vehicle on which the ADAS locator 3 is mounted. Note that the ADAS locator 3 may also be configured to use, in determining the vehicle position, a traveled distance obtained from a pulse signal sequentially output from a wheel speed sensor mounted in the host vehicle. Then, the ADAS locator 3 outputs the determined vehicle position to the in-vehicle LAN. The ADAS locator 3 also reads the map data from the map DB 32 and outputs the map data to the in-vehicle LAN.

The periphery monitoring sensor 4 detects a stationary object and a mobile object around the host vehicle and detects road markings such as a regulatory marking, a directive marking, and a lane demarcation line. The periphery monitoring sensor 4 may also be configured appropriately to use a forward camera 40 which captures an image in a predetermined range ahead of the host vehicle. For example, the forward camera 40 may appropriately be configured to be provided in a rearview mirror 11 (see FIG. 2) of the host vehicle. The forward camera 40 may also be provided in an upper surface of an instrument panel 12 (see FIG. 2) of the host vehicle. The periphery monitoring sensor 4 may also be configured to use a camera which captures an image in a range other than the range ahead of the host vehicle, a millimeter-wave radar, a sonar, LIDAR (Light Detection and Ranging/Laser Imaging Detection and Ranging), or the like.

The vehicle control ECU 5 is an electronic control device which performs acceleration/deceleration control and/or steering control for the host vehicle. Examples of the vehicle control ECU 5 include a steering ECU which performs the steering control, and a power unit control ECU and a brake ECU which perform the acceleration/deceleration control. The vehicle control ECU 5 acquires respective detection signals output from individual sensors mounted in the host vehicle, such as an accelerator position sensor, a brake pedal force sensor, a steering angle sensor, and a wheel speed sensor, and outputs respective control signals to individual drive control devices such as an electronic control throttle, a brake actuator, and an EPS (Electric Power Steering) motor. The vehicle control ECU 5 can also output the detection signals from the individual sensors described above to the in-vehicle LAN.

The automated driving ECU 6 controls the vehicle control ECU 5 to perform an automated driving function which performs a driving operation in place of the driver. The automated driving ECU 6 recognizes an environment in which the host vehicle is running from the vehicle position of the host vehicle and the map data each acquired from the ADAS locator 3 and from a detection result from the periphery monitoring sensor 4. By way of example, the automated driving ECU 6 recognizes a shape of an object around the host vehicle and a moving state thereof from the detection result from the periphery monitoring sensor 4 or recognizes a shape of a marking around the host vehicle. The automated driving ECU 6 combines the vehicle position of the host vehicle with the map data to produce a virtual space as a three-dimensional representation of a real vehicle-running environment.

The automated driving ECU 6 also plans, based on the recognized vehicle-running environment, driving schedules for causing the host vehicle to perform automated driving using the automated driving function. As the driving schedules, a long/middle-term driving schedule and a short-term driving schedule are planned. In the long/middle-term driving schedule, a route for causing the host vehicle to drive to a set destination is defined. In the short-term driving schedule, using the generated virtual space around the host vehicle, a scheduled driving trajectory for implementing driving based on the long/middle-term driving schedule is defined. Specifically, execution of steering for following a lane or changing lanes, acceleration/deceleration for speed adjustment, a crash stop for avoiding a collision is determined based on the short-term driving schedule.

The turn signal switch 7 is a switch for detecting a turn-on operation performed on a turn signal lever of the host vehicle. The turn signal switch 7 outputs, to the in-vehicle LAN, a turn signal based on the operation of the turn signal lever before a right/left turn is made.

Figure 2:
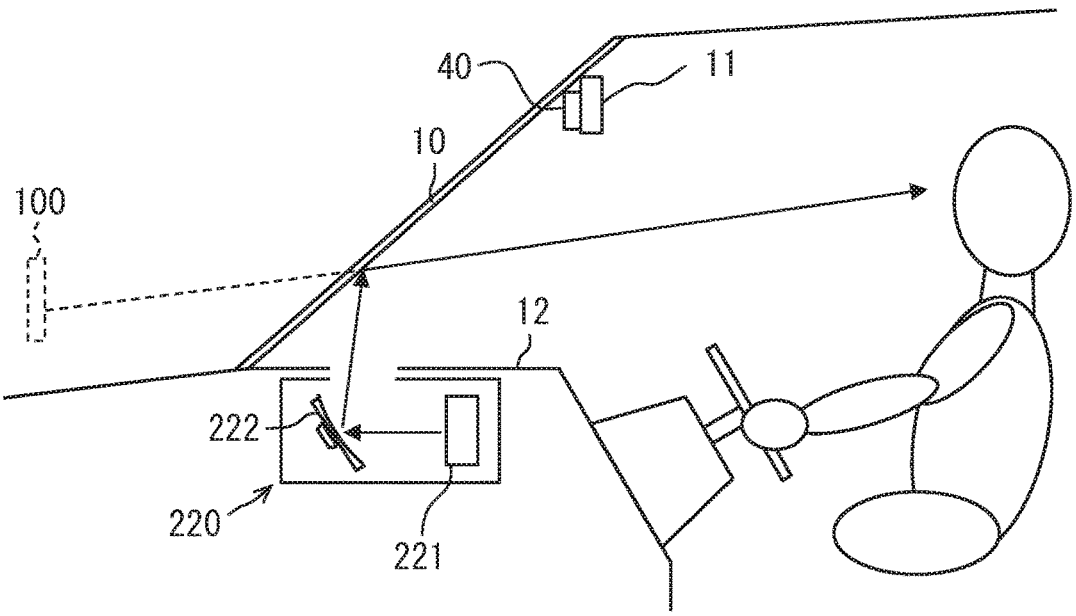
FIG. 2 is a diagram illustrating an example of mounting of a HUD in a vehicle.

The HMI system 2 includes a HCU (Human Machine Interface Control Unit) 20, an operation device 21, and a display device 22 and receives an input operation from the driver of the host vehicle or shows information to the driver of the host vehicle. The operation device 21 is a group of switches to be operated by the driver of the host vehicle. The operation device 21 is used to perform various settings. For example, the operation device 21 includes a steering switch provided in a spoke portion of a steering wheel of the host vehicle. As the display device 22, a head-up display (HUD) 220 is used. Referring to FIG. 2, a description is given herein of the HUD 220.

As shown in FIG. 2, the HUD 220 is provided in the instrument panel 12 of the host vehicle. The HUD 220 forms a displayed image based on image data output from the HCU 20 using a projector 221 of such a type as, e.g., liquid-crystal type or scanning type. Examples of the displayed image include an image representing a host vehicle state such as a vehicle speed or an operating state of the automated driving function. Examples of the displayed image also include an image representing a route scheduled to be followed by the host vehicle and an image representing an information source such as a road sign or a road marking. Note that the HUD 220 may also be configured to use an image representing information other than the information mentioned above.

The HUD 220 projects a displayed image formed by the projector 221 on a projection area already defined in a front windshield 10 as a projection member through an optical system 222 such as, e.g., a concave mirror. It is assumed that the projection area is located, e.g., in front of a driver seat. A light flux of the displayed image reflected by the front windshield 10 toward the vehicle interior is perceived by the driver occupying the driver seat. In addition, a light flux from the front view as a scene present in front of the host vehicle, which is transmitted by the front windshield 10 formed of translucent glass, is also perceived by the driver occupying the driver seat. This allows the driver to visually recognize a virtual image 100 of the displayed image formed in front of the front windshield 10 in partially superimposed relation on the front view. In other words, the HUD 220 displays the virtual image 100 in superimposed relation on the front view of the host vehicle to implement so-called AR (Augmented Reality) display.

Note that the projection member on which the HUD 220 projects the displayed image is not limited to the front windshield 10 and may also be a translucent combiner. The HMI system 2 may also be configured such that, in addition to the HUD 220, a device which displays an image is used as the display device 22. Examples of the device which displays the image include a combination meter and a CID (Center Information Display).

The HCU 20 is configured to include, as a main component, a microcomputer including a processor, a volatile memory, a nonvolatile memory, an I/O, and a bus connecting the processor, the volatile memory, the nonvolatile memory, and the I/O. The HCU 20 is connected to the HUD 220 and to the in-vehicle LAN. The HCU 20 executes a control program stored in the nonvolatile memory to control the display performed by the HUD 220. The HCU 20 corresponds to the vehicle display control device. Note that a configuration of the HCU 20 associated with the control of the display performed by the HUD 220 will be described later in detail.

<Schematic Configuration of HCU 20>

Figure 3:
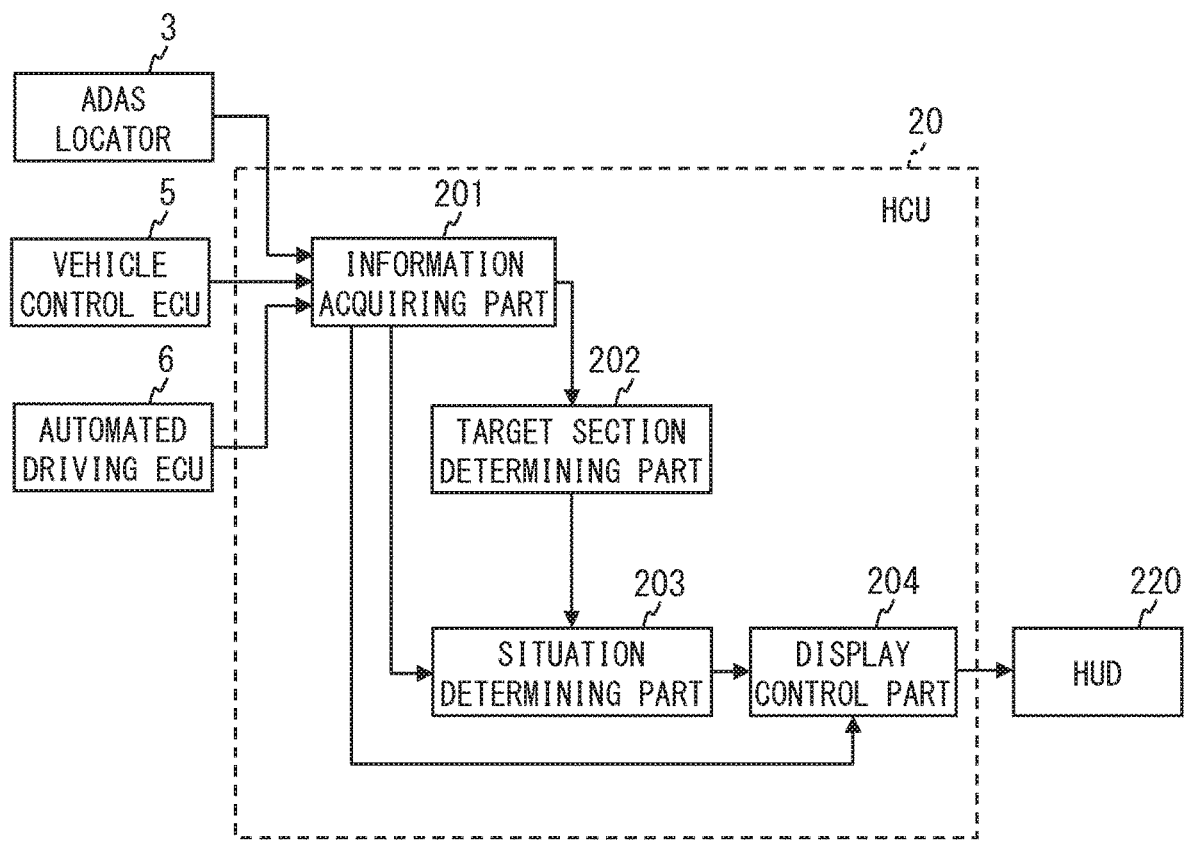
FIG. 3 is a diagram illustrating an example of a schematic configuration of a HCU.

Referring to FIG. 3, a description will be given of a schematic configuration of the HCU 20. As shown in FIG. 3, the HCU 20 includes, as a functional block, an information acquiring part 201, a target section determining part 202, a situation determining part 203, and a display control part 204 in association with the control of the display performed by the HUD 220. Note that some or all of functions to be performed by the HCU 20 may also be configured as hardware using one or a plurality of ICs or the like. Also, some or all of the functional blocks included in the HCU 20 may also be implemented by a combination of software executed by the processor and a hardware member.

The information acquiring part 201 acquires information required for the display performed by the HUD 220. Examples of the required information include information items such as the vehicle position and the map data each output from the ADAS locator 3, respective detection signals from the individual sensors which are output from the vehicle control ECU 5, the vehicle-running environment recognized by the automated driving ECU 6, and the driving schedules planned by the automated driving ECU 6.

The target section determining part 202 determines whether or not a road on which the host vehicle is running is in a section (hereinafter referred to as target section) as a target on which a virtual image for lane guidance is to be displayed (hereinafter referred to as lane guidance display). The lane guidance display shows an inner range of a lane scheduled to be followed in a front view along a shape of the lane. By way of example, it is assumed that the lane guidance display covers a majority of, e.g., equal to or more than half of a lane width of the target lane. In the first embodiment, by way of example, the following description will be given of a case where the lane guidance display covers a width substantially equal to the lane width of the target lane. The lane scheduled to be followed in the front view mentioned herein is the lane scheduled to be followed by the host vehicle according to the driving schedules. The target section mentioned herein may be a link-based section, a segment-based section, or a section demarcated on another basis. Examples of the target section include sections in which the host vehicle is required to turn, such as a pre-branch section, a pre-joint section, a section in which the host vehicle is about to turn such as a pre-curve section, and a curved road.

The target section determining part 202 may appropriately determine whether or not the section corresponding to the vehicle position of the host vehicle is the target section based on the vehicle position and the map data each output from the ADAS locator 3. The section corresponding to the vehicle position of the host vehicle may appropriately be specified by performing, e.g., a map matching process. Note that, when the position of the host vehicle on the road is specified by performing even the map matching process using the ADAS locator 3, the target section determining part 202 may appropriately be configured to use the position of the host vehicle on the road instead of the vehicle position. When curved roads are distinguished from straight roads in the map data, the curved roads may appropriately be determined as such based on the map data. Alternatively, the curved roads may also be determined as such based on a curvature among factors determining a road shape. The target section determining part 202 may also determine whether or not the section corresponding to the vehicle position of the host vehicle is the target section based on the vehicle-running environment recognized by the automated driving ECU 6.

The situation determining part 203 determines the curvature of the road on which the host vehicle is running. The road on which the host vehicle is running may appropriately be in the section corresponding to the vehicle position of the host vehicle. The curvature of the road on which the host vehicle is running corresponds to a host vehicle situation. The section corresponding to the vehicle position of the host vehicle may appropriately be specified in the same manner as described above. The section corresponding to the vehicle position of the host vehicle may be a link-based section, a segment-based section, or a section demarcated on another basis. The situation determining part 203 may determine the curvature of the road on which the host vehicle is running from the vehicle-running environment recognized by the automated driving ECU 6 or may also determine the curvature of the road on which the host vehicle is running based on the vehicle position and the map data each output from the ADAS locator 3.

The situation determining part 203 also determines whether or not the curvature of the road on which the host vehicle is running is equal to or more than a threshold. The threshold mentioned herein may appropriately be a value of the curvature at which the lane guidance display is predicted to be so deviated from the projection area as to presumably give an odd feeling to the driver. The threshold may appropriately be estimated by simulation or determined by experimental driving.

When the target section determining part 202 determines that the road on which the host vehicle is running is in the target section and when the situation determining part 203 determines that the curvature of the road on which the host vehicle is running is less than the threshold, the display control part 204 causes the HUD 220 to perform the lane guidance display showing the inner range of a lane scheduled to be followed in the front view along the shape of the lane. The lane scheduled to be followed may appropriately be specified according to the driving schedules planned by the automated driving ECU 6. The display control part 204 may appropriately be configured to perform position and shape adjustment between the lane scheduled to be followed in the front view and the lane guidance display using the vehicle-running environment recognized by the automated driving ECU 6, camera parameters of the forward camera 40, or the like. The display control part 204 may appropriately be configured to perform drawing for the lane guidance along the shape of the lane scheduled to be followed by approximating the shape of the lane scheduled to be followed with a three-dimensional spline curve, a polynomial expression, or the like.

Figure 4:
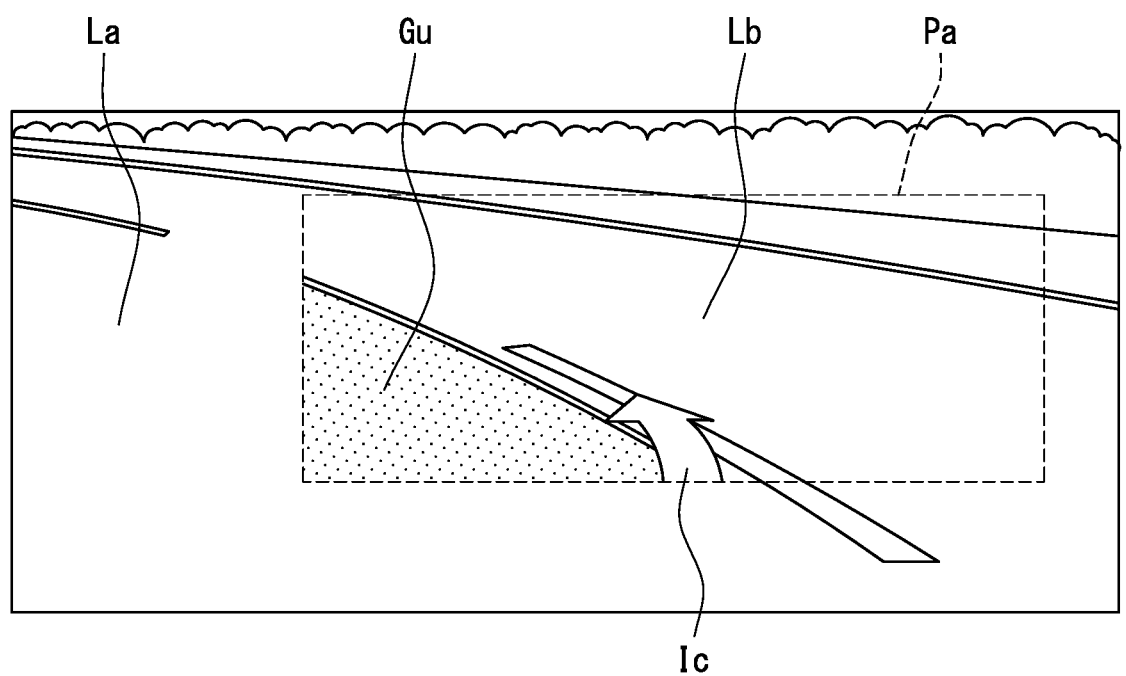
FIG. 4 is a diagram for explaining an issue which arises when a configuration of a first embodiment is not used.

On the other hand, even though the target section determining part 202 determines that the road on which the host vehicle is running is in the target section, when the situation determining part 203 determines that the curvature of the road on which the host vehicle is running is equal to or more than the threshold, the display control part 204 prevents the HUD 220 from performing the lane guidance display. This is because, when the host vehicle turns, depending on the magnitude of the curvature of the road on which the host vehicle is running, an issue shown below arises. Specifically, as shown in FIG. 4, when the host vehicle turns, depending on the magnitude of the curvature of the road on which the host vehicle is running, a situation is encountered in which a part of the lane (see La in FIG. 4) scheduled to be followed by the host vehicle which is more distant from the host vehicle deviates leftward or rightward from the projection area (see Pa in FIG. 4) in front of the driver seat. This results in a situation in which, as shown in FIG. 4, the lane guidance display (see Gu in FIG. 4) is partially missing. As a result, the driver is less likely to recognize an intention indicated by the lane guidance display and the odd feeling given to the driver by the lane guidance display increases, which may cause the driver to feel annoyed. By contrast, in the first embodiment, when it is determined that the curvature of the road on which the host vehicle is running is equal to or more than the threshold, the HUD 220 is prevented from performing the lane guidance display to allow a reduction in such feeling of annoyance.

When the target section determining part 202 determines that the road on which the host vehicle is running is not the target section, the display control part 204 prevents the HUD 220 from performing the lane guidance display. When causing the HUD 220 to perform display during automated driving of the host vehicle, the display control part 204 causes a virtual image of an icon (hereinafter referred to as route direction icon) representing a scheduled route direction of the host vehicle to be displayed (see Ic in FIG. 4) either in a case where the lane guidance display is allowed to be performed or in a case where the lane guidance display is not allowed to be performed. The route direction icon is an image of a type different from that of the lane guidance described above. The route direction icon may appropriately be configured to have, e.g., an arrow shape indicating the direction of the scheduled route of the host vehicle. In the following, the display of the virtual image of the route direction icon is referred to as route direction icon display.

The display control part 204 preferably causes the virtual image of the route direction icon to be displayed in superimposed relation on the inside of the lane scheduled to be followed in the front view so as to allow the driver to easily and intuitively recognize the scheduled route direction of the host vehicle. Since the lane scheduled to be followed in the front view has at least a portion located in front of the driver seat of the host vehicle, it is preferable to cause the virtual image of the route direction icon to be displayed, by default, in superimposed relation on a center of the projection area located in front of the driver seat in a vehicle width direction and thus displayed on the inside of the lane scheduled to be followed in the front view.

More preferably, the display control part 204 shifts a position at which the virtual image of the route direction icon is displayed in a direction in which the host vehicle turns as the curvature of the road on which the host vehicle is running increases. This is because, when the display position of the virtual image of the route direction icon is fixed to the center of the projection area in the vehicle width direction, the following problem arises. Specifically, as shown in FIG. 4, when the host vehicle turns, depending on the magnitude of the curvature of the road on which the host vehicle is running, a situation is encountered in which a majority of the projection area (see Pa in FIG. 4) in front of the driver seat is occupied by a lane (see Lb in FIG. 4) adjacent to the lane scheduled to be followed by the host vehicle. This results in a situation in which, as shown in FIG. 4, the virtual image of the route direction icon (see Ic in FIG. 4) fixed to the center of the projection area in the vehicle width direction is disadvantageously displayed in superimposed relation on the adjacent lane. As a result, the driver is less likely to recognize the intension indicated by the route direction icon and the odd feeling given to the driver by the route direction icon increases, which may cause the driver to feel annoyed.

By contrast, in the first embodiment, the display position of the virtual image of the route direction icon is shifted in the direction in which the host vehicle turns as the curvature of the road on which the host vehicle is running increases. This allows the display position of the virtual image of the route direction icon to more easily fall within the lane scheduled to be followed by the host vehicle and can reduce such feeling of annoyance. It is assumed that the correspondence relationship between the magnitude of the curvature of the road on which the host vehicle is running and an amount of shift of the display position of the virtual image of the route direction icon is determined so as to allow the virtual image of the route direction icon to fall within the lane scheduled to be followed by the host vehicle.

It is also preferable that, when shifting the position at which the virtual image of the route direction icon is displayed in superimposed relation on the front view, the display control part 204 shifts the display position of the virtual image of the route direction icon such that the display position of the virtual image of the route direction icon falls within the inner range of the projection area. By way of example, the display control part 204 may be configured appropriately to shift the display position of the virtual image of the route direction icon in the direction in which the host vehicle turns as the curvature of the road on which the host vehicle is running increases until the display position of the virtual image of the route direction icon falls within the inner range of the projection area. On the other hand, when the display position of the virtual image of the route direction icon protrudes to the outside of the projection area, the display control part 204 stops the display position of the virtual image of the route direction icon at the boundary portion between the inside and the outside the projection area. This can prevent the problem that the partially missing virtual image of the route direction icon is displayed.

<Virtual Image Display Control Related Process in HCU 20>

Figure 5:
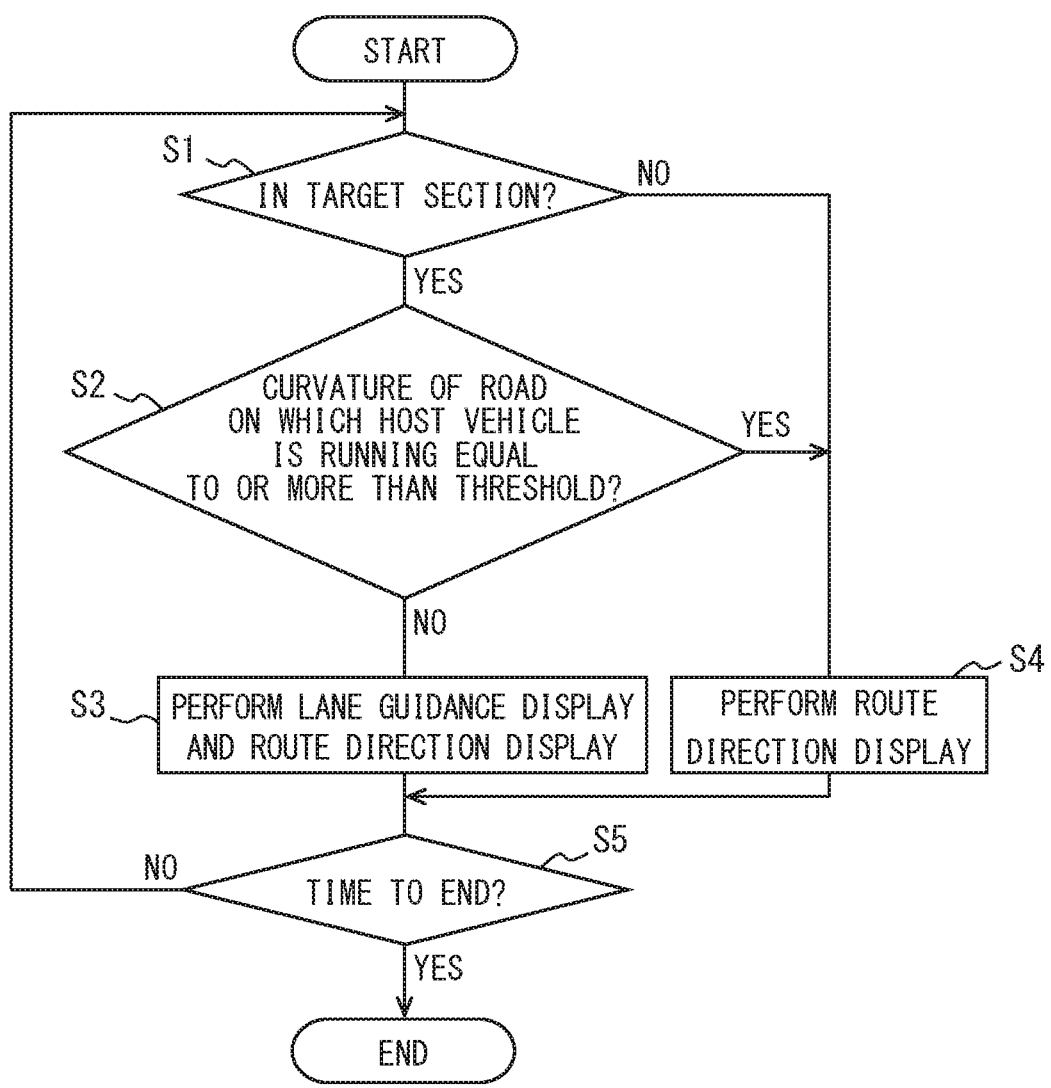
FIG. 5 is a flow chart illustrating an example of a flow of a virtual image display control related process in the HCU.

Subsequently, using the flow chart of FIG. 5, a description will be given of an example of a flow of a process (hereinafter referred to as virtual image display control related process) related to the control of the display performed by the HUD 220, which is executed in the HCU 20. The flow chart of FIG. 5 may appropriately be configured to be started when a power source of the HUD 220 is turned ON and a function of the HUD 220 is turned ON. The HUD 220 may appropriately be configured such that the function of the HUD 220 is selectively turned on or off in response to an input operation received by the operation device 21. The HUD 220 may also be configured appropriately such that the power source of the HUD 220 is selectively turned on or off in response to the turning on or off of a switch (hereinafter referred to as power switch) for starting an internal combustion engine or a motor generator of the host vehicle.

First, in S1, the target section determining part 202 determines whether or not the road on which the host vehicle is running is in the target section. When the target section determining part 202 determines that the road on which the host vehicle is running is in the target section (YES in S1), the virtual image display control related process proceeds to S2. When the target section determining part 202 determines that the road on which the host vehicle is running is not in the target section (NO in S1), the virtual image display control related process proceeds to S4.

In S2, the situation determining part 203 determines whether or not the curvature of the road on which the host vehicle is running is equal to or more than the threshold. When the situation determining part 203 determines that the curvature is equal to or more than the threshold (YES in S2), the virtual image display control related process proceeds to S4. On the other hand, when the situation determining part 203 determines that the curvature is less than the threshold (NO in S2), the virtual image display control related process proceeds to S3. Note that the situation determining part 203 may also be configured to use a radius of curvature instead of the curvature. In this case, the situation determining part 203 may appropriately be configured to use, as a threshold, a value of a reciprocal of the radius of curvature. Thus, the situation determining part 203 may proceed the virtual image display control related process to S4 when determining that the radius of curvature is equal to or less than the threshold and proceed the virtual image display control related process to S3 when determining that the radius of curvature is larger than the threshold.

In S3, the display control part 204 causes the HUD 220 to perform the lane guidance display in addition to the route direction icon display, and proceeds the virtual image display control related process to S5. On the other hand, in S4, the display control part 204 causes the HUD 220 to perform the route direction icon display, but does not allow the HUD 220 to perform the lane guidance display, and proceeds the virtual image display control related process to S5. Preferably, in each of S3 and S4, the display control part 204 shifts the display position of the virtual image of the route direction icon in the direction in which the host vehicle turns as the curvature of the road on which the host vehicle is running increases. More preferably, the display control part 204 shifts, when shifting the position at which the virtual image of the route direction icon is displayed in superimposed relation on the front view, the display position of the virtual image of the route direction icon such that the display position of the virtual image of the route direction icon falls within the projection area.

In S5, when it is time to end the virtual image display control related process (YES in S5), the virtual image display control related process is ended. On the other hand, when it is not time to end the virtual image display control related process (NO in S5), the virtual image display control related process is returned to S1 to be repeated. Examples of the time to end the virtual image display control related process include a time when the power switch of the host vehicle is turned off and a time when the function of the HUD 220 is turned off.

Figure 6A:
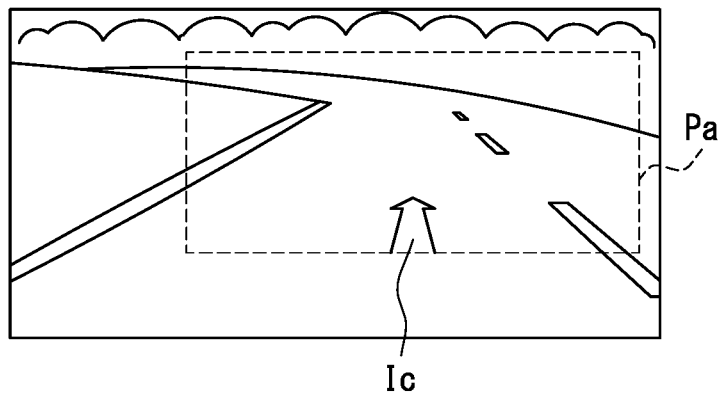
FIG. 6A is a diagram for explaining an example of a transition of superimposed display of a virtual image responding to the changing of a road on which a host vehicle is running.
Figure 6B:
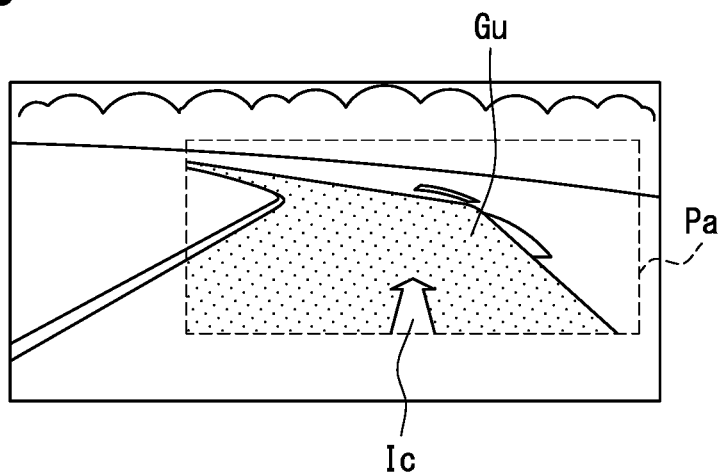
FIG. 6B is a diagram for explaining an example of the transition of the superimposed display of the virtual image responding to the changing of the road on which the host vehicle is running.
Figure 6C:
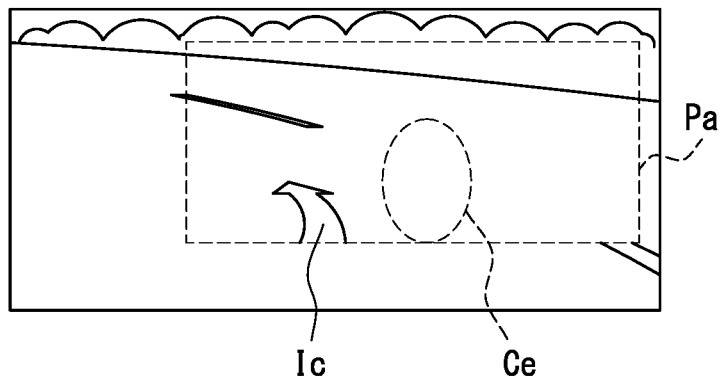
FIG. 6C is a diagram for explaining an example of the transition of the superimposed display of the virtual image responding to the changing of the road on which the host vehicle is running.

Referring to FIGS. 6A to 6C, a description is given of an example of a transition of the superimposed display of the virtual image responding to the changing of the road on which the host vehicle is running. FIG. 6A shows an example of the superimposed display of the virtual image on a straight road. FIG. 6B shows an example of the superimposed display of the virtual image before a curve. FIG. 6C shows an example of the superimposed display of the virtual image while the host vehicle is turning the curve. In FIGS. 6A to 6C, Pa represents the projection area, Ic represents the route direction icon display, Gu represents the guidance display, and Ce represents a region at the center of the projection area in the vehicle width direction.

As shown in FIG. 6A, while the host vehicle is running on the straight road, of the route direction icon display (see Ic in FIG. 6A) and the guidance display (see Gu in FIG. 6B), only the route direction icon display is superimposed on the front view. On the other hand, when the host vehicle reaches a point immediately before the curve, in addition to the route direction icon display, the guidance display is also superimposed on the front view. Then, while the host vehicle is turning the curve having the curvature equal to or more than the threshold, the guidance display is stopped and, of the route direction icon display and the guidance display, only the route direction icon display is superimposed on the front view. The route direction icon display is performed in such a manner as to be shifted from the center (see Ce in FIG. 6C) of the projection area (see Pa in FIG. 6C) in the vehicle width direction into the direction in which the host vehicle turns as the curvature of the road on which the host vehicle is running increases.

<Summarization of First Embodiment>

With the configuration of the first embodiment, even while the host vehicle is performing automated driving, the guidance display allows the driver to recognize that a system of the host vehicle can recognize the lane of the curved road and turns in the target section such as a pre-curve section, a pre-joint section, a pre-branch section, or a curve having a curvature less than the threshold and thus allows the driver to feel secure about a system status. On the other hand, while the host vehicle is running on the straight road on which, as long as the driver can recognize that the host vehicle continues to run straight, the driver can conceivably feel rather secure, of the route direction icon display and the guidance display, only the route direction icon display is performed in superimposed relation on the front view to be able to reduce the annoyance caused in the driver by excessive information. In addition, while the host vehicle is turning the curve having the curvature equal to or more than the threshold, the lane guidance display is stopped to reduce the annoyance caused in the driver by the partially missing lane guidance display. Since the route direction icon display is continued even while the host vehicle is turning the curve having the curvature equal to or more than the threshold, the driver can recognize that the system of the host vehicle turns on a curved road and is thereby allowed to feel secure about the system status.

(Modification 1)

In the configuration shown in the first embodiment, the display control part 204 selectively determines, with respect to the lane guidance display showing the inner range of the lane scheduled to be followed in the front view along the shape of the lane, whether or not the superimposed display on the front view is to be stopped based on whether or not the curvature of the road on which the host vehicle is running is equal to or more than the threshold. However, a configuration to be used is not necessarily limited thereto. For example, it may also be possible to use a configuration to be applied to guidance display, other than the lane guidance display, along the shape of the lane scheduled to be followed in the front view. For example, it may also be possible to perform the guidance display for showing an inter-vehicular distance between the host vehicle and a vehicle ahead of the host vehicle. In this case, it is appropriate to use a configuration in which the vehicle ahead of the host vehicle is detected as a target of the guidance display by the periphery monitoring sensor 4 and, depending on whether or not the curvature of the road on which the host vehicle is running is equal to or more than the threshold, whether or not the superimposed display on the front view is to be stopped is selectively determined. The shape of the guidance display is not limited to such a sheet shape as in the example of the lane guidance display shown in FIGS. 3 and 6A to 6C. The shape of the guidance display may also be another shape such as, e.g., a ladder shape or a shape in which a plurality of arrow head portions of arrows are arranged on the route.

(Second Modification)

In the configuration shown in the first embodiment, when the display control part 204 causes the HUD 220 to perform display during the automated driving, the HUD 220 is caused to constantly perform the route direction icon display. However, a configuration to be used is not necessarily limited thereto. For example, it may also be possible to use a configuration in which the display control part 204 causes the HUD 220 to perform the route direction icon display only when the HUD 220 is not caused to perform the lane guidance display. Note that the same applies also to the first modification in which the guidance display is performed instead of the lane guidance display.

(Third Modification)

In the embodiment and the modifications each described above, the example applied to the case where the host vehicle performs the automated driving has been described. However, a configuration to be used is not necessarily limited thereto. For example, it may also be possible to use a configuration to be applied to the case where the host vehicle is manually driven. Alternatively, it may also be possible to use a configuration in which the host vehicle does not have an automated driving function. In this case, the configuration may appropriately be such that the vehicle system 1 does not include the automated driving ECU 6, and the recognition of the vehicle-running environment is performed by another ECU, such as the HCU 20.

(Fourth Modification)

In the configuration shown in the first embodiment, the target section in which the lane guidance display is to be performed is limited, but a configuration to be used is not necessarily limited thereto. For example, it may also be possible to use a configuration in which the target section in which the lane guidance display is to be performed is not limited. In this case, the configuration may appropriately be such that the HCU 20 does not include the target section determining part 202. Note that the same applies also to the first modification in which the guidance display is performed instead of the lane guidance display.

(Modification 5)

In the configuration shown in the first embodiment, depending on whether or not the curvature of the road on which the host vehicle is running is equal to or more than the threshold, it is selectively determined whether or not the lane guidance display on the front view is to be stopped. However, a configuration to be used is not necessarily limited thereto. For example, it may also be possible to use a configuration in which, e.g., depending on whether or not a gradient change of the road on which the host vehicle is running is equal to or more than the threshold, it is selectively determined whether or not the lane guidance display on the front view is to be stopped (hereinafter referred to as a fifth modification). This is because, depending on a magnitude of the gradient change of the host vehicle, a situation is encountered in which a part of the lane scheduled to be followed by the host vehicle which is more distant from the host vehicle deviates upwardly or downwardly from the projection area in front of the driver seat, resulting in the partly missing lane guidance display which may cause the driver to feel annoyed.

In the case of adopting the fifth modification, the situation determining part 203 may appropriately be configured to determine the gradient change of the road on which the host vehicle is running. In this case, the situation determining part 203 may appropriately determine the gradient change of the road on which the host vehicle is running based on the vehicle-running environment recognized by the automated driving ECU 6 or may also determine the gradient change of the road on which the host vehicle is running based on the vehicle position and the map data each output from the ADAS locator 3. The gradient change of the road on which the host vehicle is running corresponds to the host vehicle situation. By way of example, as the gradient change, a change rate of a longitudinal gradient of a section subsequent to the section corresponding to the current vehicle position or the like may appropriately be used.

In the case of adopting the fifth modification, the situation determining part 203 determines whether or not the gradient change of the road on which the host vehicle is running is equal to or more than a threshold. The threshold mentioned herein may appropriately be a value of the gradient change at which the lane guidance display is predicted to be so deviated from the projection area as to presumably give an odd feeling to the driver. The threshold may appropriately be estimated by simulation or determined by experimental driving. Note that, in the case of adopting the fifth modification also, in the same manner as in the first embodiment, it may be possible to use the configuration in which, depending on whether or not the curvature of the road on which the host vehicle is running is equal to or more than the threshold, it is selectively determined whether or not the superimposed display on the front view is to be stopped. Alternatively, it may also be possible to use a configuration to be combined with the first modification in which the guidance display is performed instead of the lane guidance display.

Second Embodiment

In the configuration shown in each of the embodiment and the modifications described above, depending on a road structure such as the curvature or gradient change of the road on which the host vehicle is running, it is selectively determined whether or not the lane guidance display on the front view is to be stopped. However, a configuration to be used is not necessarily be limited thereto. For example, it may also be possible to use a configuration (hereinafter referred to as a second embodiment) in which, depending on whether or not a target information source as a target road sign or a target road marking ahead of the host vehicle on the route is in a situation in which the target information source is less recognizable by the driver, it is selectively determined whether or not a virtual image representing the target information source is to be displayed in superimposed relation on the front view. The following will describe the second embodiment.

The vehicle system 1 of the second embodiment 2 is the same as the vehicle system 1 of the first embodiment except that the vehicle system 1 of the second embodiment includes a HCU 20a, instead of the HCU 20. The HCU 20a is the same as the HCU 20 of the first embodiment except that a configuration of the HCU 20a related to the control of the display performed by the HUD 220 is partly different from that of the HCU 20.

In the second embodiment, it may also be possible to use a configuration to be applied to a case where the virtual image representing the target information source is displayed in superimposed relation on the front view during the automated driving. However, the following will describe the configuration on the assumption that the configuration is to be applied to a case where the virtual image representing the target information source is displayed in superimposed relation on the front view during manual driving. Accordingly, in the second embodiment, it may also be possible to use a configuration in which the vehicle system 1 does not include the automated driving ECU 6, and the recognition of the vehicle-running environment is performed by another ECU such as the HCU 20a.

<Schematic Configuration of HCU 20a>

Figure 7:
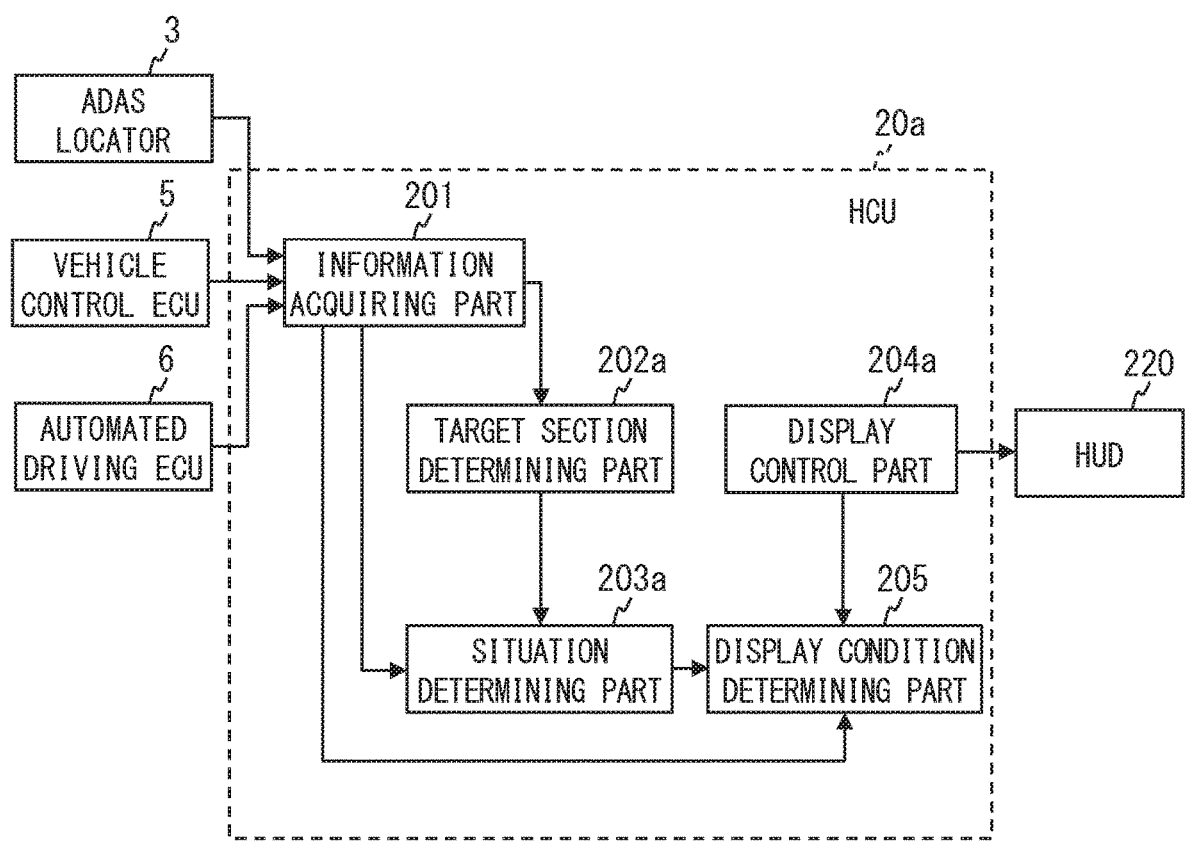
FIG. 7 is a diagram illustrating an example of the schematic configuration of the HCU.

Referring to FIG. 7, a description is given herein of a schematic configuration of the HCU 20a. As shown in FIG. 7, the HCU 20a includes, as a functional block, the information acquiring part 201, a target section determining part 202a, a situation determining part 203a, a display control part 204a, and a display condition determining part 205 in association with the control of the display performed by the HUD 220. The HCU 20a also corresponds to the vehicle display control device.

The target section determining part 202a determines whether or not the road on which the host vehicle is running is in a target section in which the target information source is present. The target information source can be set to any road sign or to any road marking. Examples of the target information source include a sign which prohibits or specifies a specific traffic method such as a temporary halt sign, a no-parking sign, a no-entry sign, or a maximum speed sign, a sign which represents a permitted behavior, an alert sign, and a guide sign. There are also a marking which prohibits or specifies a specific traffic method, such as a temporary halt marking, a no-parking marking, a maximum speed marking, or a no-stopping zone marking, a marking which represents a permitted behavior such as a right turn arrow in a right-turn-only lane, and the like. The target section mentioned herein may be a link-based section, a segment-based section, or a section demarcated on another basis.

Similarly to the target section determining part 202, the target section determining part 202a may appropriately determine whether or not the section corresponding to the vehicle position of the host vehicle is in the target section based on the vehicle position and the map data each output from the ADAS locator 3. The presence of the target information source may appropriately be determined using road sign data, road marking data, or the like each included in the three-dimensional map data.

The situation determining part 203a determines whether or not the target information source ahead of the host vehicle on the route is in a situation (hereinafter referred to as recognition difficult situation) in which the target information source is less likely to be recognized by the driver. Whether or not the target information source is in the recognition difficult situation corresponds to the host vehicle situation. For example, when the periphery monitoring sensor 4 has not successfully detected the target information source at a position ahead of the host vehicle on the route at which, according to the map data, the target information source is presumed to be present, the situation determining part 203a determines that the target information source is in the recognition difficult situation. On the other hand, when the periphery monitoring sensor 4 has successfully detected the target information source, the situation determining part 203a determines that the target information source is not in the recognition difficult situation. By way of example, whether or not the periphery monitoring sensor 4 has successfully detected the target information source may appropriately be determined depending on whether or not the target information source has successfully been recognized at a position in the vehicle-running environment recognized by the automated driving ECU 6 at which, according to the map data, the target information source is presumed to be present.

Examples of a case where the recognition difficult situation is encountered include cases as shown below. For example, in one of the cases, a road marking as the target information source is partly missing or covered with snow or the like and is less recognizable. In another of the cases, a road sign as the target information source is partly missing or hidden by a parked vehicle, a vehicle ahead, a geographical feature, or a structure and is less recognizable.

The display condition determining part 205 determines, when the situation determining part 203*a* determines that the target information source is in the recognition difficult situation, whether or not a condition for displaying the virtual image representing the target information source determined to be in the recognition difficult state is satisfied. Examples of the display condition include a distance between the target information source and the host vehicle which is less than a set value. The set value may appropriately be an arbitrarily settable distance which is presumed to allow the host vehicle to behave in accordance with what is represented by the target information source before the host vehicle reaches the target information source. Besides, when the target information source shows a regulation which prohibits or specifies a specific traffic method such as no parking, a sign of not following the regulation shown by the target information source, which is shown by the host vehicle, may also be used as the display condition.

The sign of not following the regulation shown by the target information source may appropriately be detected from the running state of the host vehicle. By way of example, the sign of not following the regulation shown by the target information source may appropriately be detected based on detection signals from the individual sensors which are output from the vehicle control ECU 5 or the like. When the target information source is a sign showing no parking, based on a detection signal from the wheel speed sensor, the speed of the host vehicle which becomes equal to or less than a predetermined speed may also be detected as the sign of not following the regulation. Alternatively, based on a signal from a hazard switch, the turning ON of the hazard switch may also be detected as the sign of not following the regulation. When the target information source is the sign or a marking showing the maximum speed, based on the detection signal from the wheel speed sensor, the speed of the host vehicle exceeding the maximum speed regulated by the target information source may appropriately be detected as the sign of not following the regulation.

When the display condition determining part 205 determines that the display condition is satisfied, the display control part 204*a* causes the HUD 220 to display the virtual image representing the target information source in superimposed relation on the front view. The display of the virtual image representing the target information source is hereinafter referred to as target information source display. On the other hand, when the display condition determining part 205 determines that the display condition is not satisfied, the display control part 204*a* prevents the HUD 220 from performing the target information source display.

The display control part 204*a* may also be configured to cause the HUD 220 to perform the target information source display in superimposed relation on a position (hereinafter referred to a target present position) at which the target information source determined to be in the recognition difficult situation should be present in the front view. The display control part 204*a* may also be configured to selectively determine whether the target information source display is to be performed in superimposed relation on the target present position or on a position other than the target present position depending on a type of the recognition difficult situation.

By way of example, when the situation determining part 203*a* determines that the target information source is in the recognition difficult situation because the periphery monitoring sensor 4 has detected an obstacle such as a geographical feature, a structure, a parked vehicle, or a vehicle ahead at a position at which the target information source is presumed to be present, the display control part 204*a* may appropriately be configured to cause the HUD 220 to perform the target information source display in superimposed relation on a position other than the target present position. On the other hand, when the situation determining part 203*a* has determined that the target information source is in the recognition difficult situation though the periphery monitoring sensor 4 has not detected an obstacle at the position at which the target information source is presumed to be present, the display control part 204*a* may appropriately be configured to cause the HUD 220 to perform the target information source display in superimposed relation on the target present position.

A description is given herein of a specific example of the target information source display in the display control part 204*a*. For example, when a marking showing a direction of travel permitted in a lane, such as a right turn arrow in a right-turn-only lane, is partly missing or covered with snow and is therefore determined to be in the recognition difficult situation, the display control part 204*a* may appropriately cause the HUD 220 to perform the target information source display in superimposed relation on a position at which the marking is originally present in the front view. As the target information source display, a virtual image of an image of the marking showing the direction of travel may appropriately be displayed.

Figure 8A:
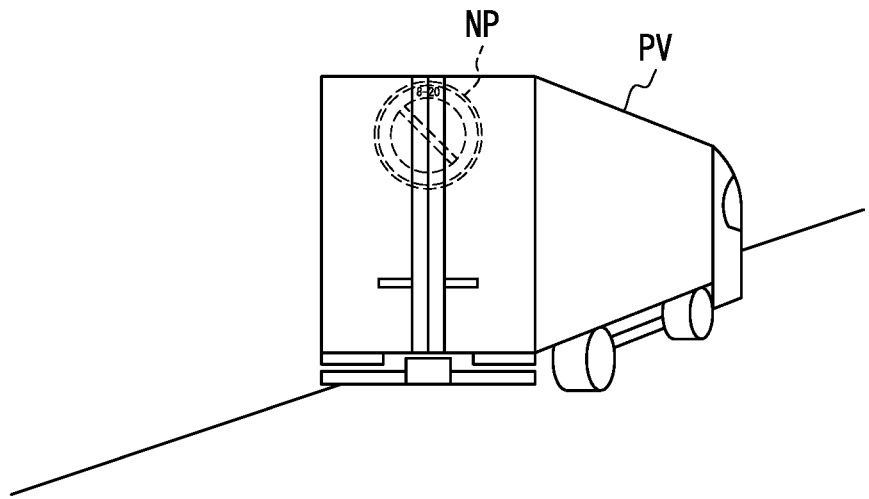
FIG. 8A is a diagram for explaining a specific example of target information source display in a display control part.
Figure 8B:
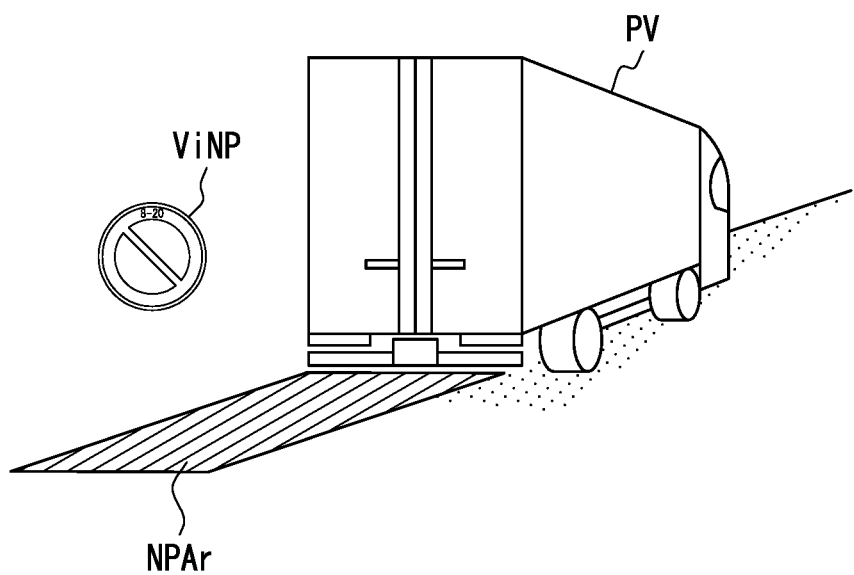
FIG. 8B is a diagram for explaining a specific example of the target information source display in the display control part.

Also, as shown in FIG. 8A, when a sign (see NP) showing no parking is hidden by a parked vehicle (see PV) and is therefore determined to be in the recognition difficult situation, as shown in FIG. 8B, the display control part 204*a* may appropriately cause the HUD 220 to perform the target information source display (see ViNP) in superimposed relation on a position other than the position at which the sign showing no parking is originally present in the front view. As the target information source display, the virtual image (see ViNP) of an image of the sign showing no parking may appropriately be displayed at a position away from the parked vehicle. Note that the display control part 204*a* may also be configured to cause a virtual image (see NPAr) representing a no-parking area to be displayed, in addition to the virtual image of the image of the sign showing no parking, in superimposed relation on an area corresponding to the no-parking area in the front view. By way of example, by causing data on the no-parking area to be included in the map data, the no-parking area may appropriately be allowed to be specified based on the map data. To allow the driver to easily recognize that the virtual image representing the no-parking area indicates prohibition, the virtual image representing the no-parking area preferably has a color, a pattern, or the like different from that of the lane guidance display. By way of example, the virtual image representing the no-parking area may appropriately have a pattern or the like similar to that of a zebra zone. Also, to allow the driver to easily recognize that the virtual image representing the no-parking area indicates prohibition, the display control part 204*a* may also be configured to cause the HUD 220 to display a three-dimensional object as the virtual image.

Figure 9A:
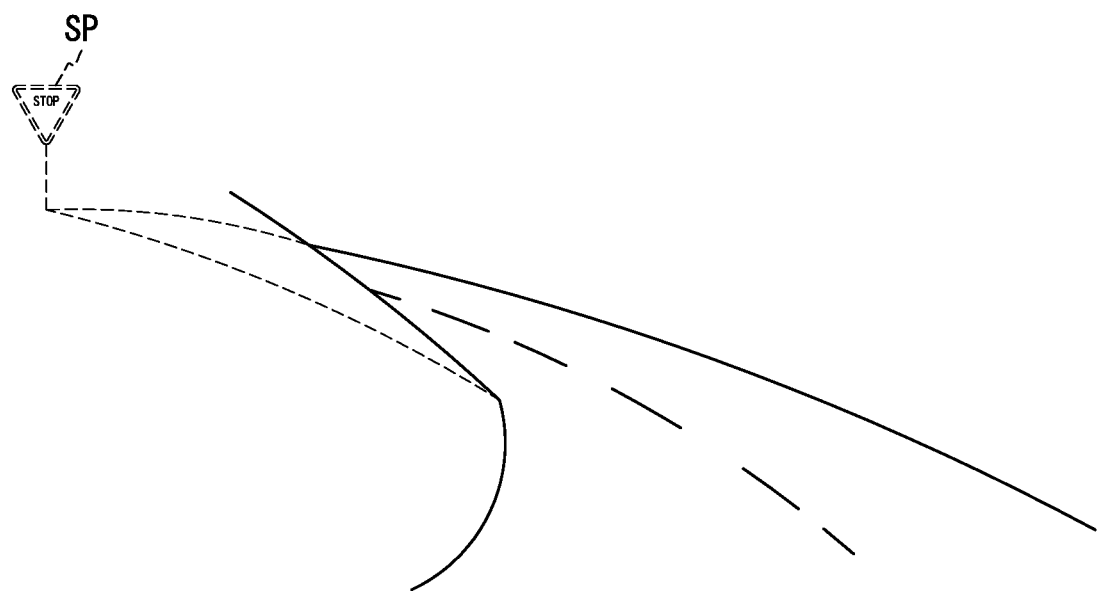
FIG. 9A is a diagram for explaining a specific example of the target information source display in the display control part.
Figure 9B:
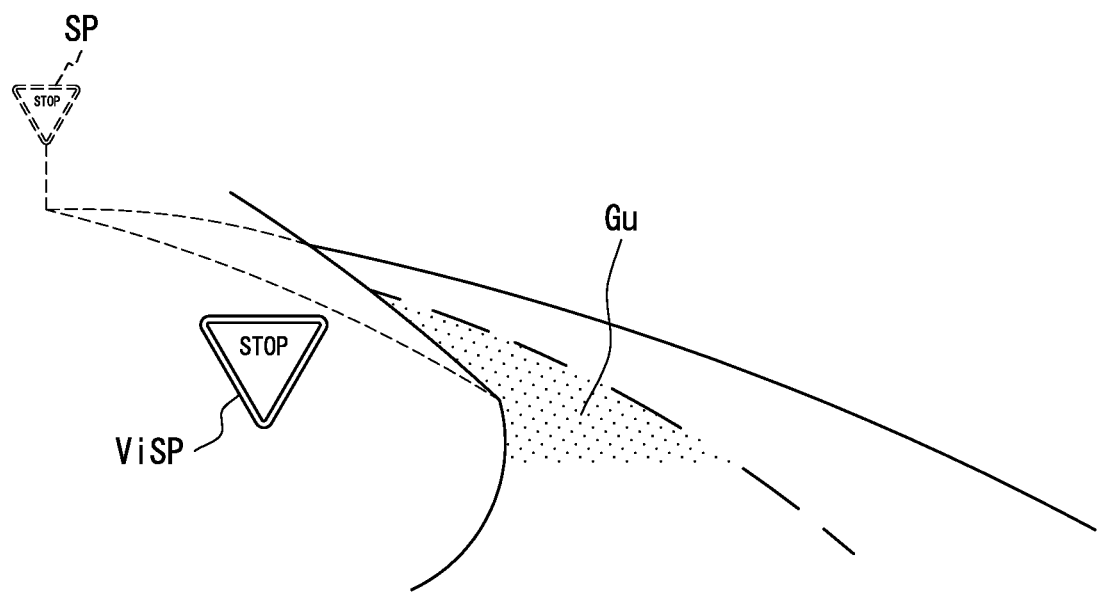
FIG. 9B is a diagram for explaining a specific example of the target information source display in the display control part.

Besides, as shown in FIG. 9A, when a sign (see SP) showing a temporary halt is hidden by a geographical feature and is therefore determined to be in the recognition difficult situation, as shown in FIG. 9B, the display control part 204*a* may appropriately cause the HUD 220 to perform the target information source display (see ViSP) in superimposed relation on a position other than the position at which the sign showing a temporary halt is originally present in the front view. As the target information source display, the virtual image (see ViSP) of an image of the sign showing a temporary halt may appropriately be displayed. Note that the display control part 204a may also be configured to cause the HUD 220 to perform the lane guidance display (see Gu) described above in superimposed relation on the lane scheduled to be followed in the front view, in addition to displaying the virtual image of the image of the sign showing a temporary halt. By way of example, the lane scheduled to be followed may appropriately be the same as the lane in which the host vehicle is running.

<Virtual Image Display Control Related Process in HCU 20a>

Figure 10:
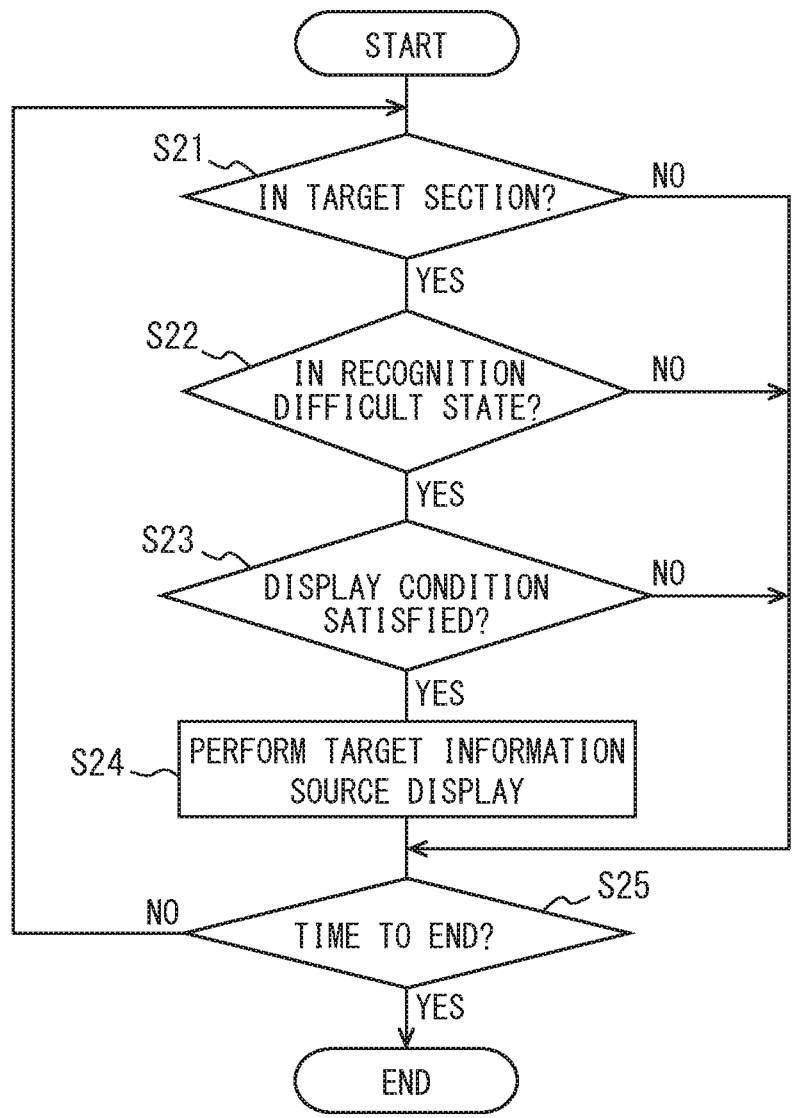
FIG. 10 is a flow chart illustrating an example of the flow of the virtual image display control related process in the HCU.

Subsequently, using a flow chart of FIG. 10, a description will be given of an example of the flow of the virtual image display control related process in the HCU 20a. In the flow chart of FIG. 10 also, in the same manner as in the flow chart in FIG. 5, the virtual image display control related process may appropriately be configured to be started when the power supply of the HUD 220 is turned on and the function of the HUD 220 is turned on.

First, in S21, the target section determining part 202a determines whether or not the road on which the host vehicle is running is in the target section. When the target section determining part 202a determines that the road on which the host vehicle is running is in the target section (YES in S21), the virtual image display control related process proceeds to S22. On the other hand, when the target section determining part 202a determines that the road on which the host vehicle is running is not in the target section (NO in S21), the virtual image display control related process proceeds to S25.

In S22, the situation determining part 203a determines whether or not the target information source ahead of the host vehicle on the route is in the recognition difficult situation in which the target information source is less recognizable by the driver. When the situation determining part 203a determines that the target information source is in the recognition difficult situation (YES in S22), the virtual image display control related process proceeds to S23. On the other hand, when the situation determining part 203a determines that the target information source is not in the recognition difficult situation (NO in S22), the virtual image display control related process proceeds to S25.

In S23, the display condition determining part 205 determines whether or not the condition for displaying the virtual image representing the target information source determined to be in the recognition difficult situation is satisfied. When the display condition determining part 205 determines that the display condition is satisfied (YES in S23), the virtual image display control related process proceeds to S24. On the other hand, when the display condition determining part 205 determines that the display condition is not satisfied, the virtual image display control related process proceeds to S25.

In S24, the display control part 204a causes the HUD 220 to perform the target information source display in superimposed relation on the front view, and the virtual image display control related process proceeds to S25. The target information source display may appropriately be ended when the host vehicle has passed through the position at which the target information source is present or ended when the display condition determining part 205 determines that the display condition is not satisfied.

In S25, when it is time to end the virtual image display control related process (YES in S25), the virtual image display control related process is ended. On the other hand, when it is not time to end the virtual image display control related process (NO in S25), the virtual image display control related process is returned to S21 to be repeated.

<Summarization of Second Embodiment>

With the configuration of the second embodiment, the virtual image representing the target information source is not constantly displayed, but is displayed when it is determined that the target information source ahead of the host vehicle on the route is in the situation in which the target information source is less recognizable by the driver. This allows the virtual image representing the target information source to be displayed at a time when the display of the virtual image representing the target information source is presumed to be useful to the driver and also allows a reduction in the annoyance felt by the driver compared to a case where the target information source is allowed to be constantly displayed.

By also using the approach to the target information source as the display condition, it is possible to restrict the virtual image representing the target information source from being displayed at a time when the display of the virtual image is less likely to be useful to the driver. This can further reduce the annoyance felt by the driver. Besides, by also using the sign of not following the regulation shown by the target information source as the display condition, it is possible to restrict the virtual image of the target information source from being displayed though the host vehicle is following the regulation shown by the target information source. This can further reduce the annoyance felt by the driver.

(Sixth Modification)

In the configuration shown in the second embodiment, when the display condition determining part 205 determines that the display condition is satisfied, the display control part 204a causes the HUD 220 to display the virtual image representing the target information source in superimposed relation on the front view, but a configuration to be used is not limited thereto. For example, it may also be possible to use a configuration in which the HCU 20a does not include the display condition determining part 205 and, when the situation determining part 203a determines that the target information source ahead of the host vehicle on the route is in the recognition difficult situation in which the target information source is less recognizable by the driver, the display control part 204a causes the HUD 220 to display the virtual image representing the target information source in superimposed relation on the front view.

Third Embodiment

Alternatively, it may also be possible to use a configuration (hereinafter referred to as a third embodiment) in which, depending on whether or not the target information source as a target road sign or a target road marking ahead of the host vehicle on the route is in a situation in which the target information source is presumed to be overlooked by the driver, it is selectively determined whether or not a virtual image representing the target information source is to be displayed in superimposed relation on the front view. The following will describe the third embodiment.

The vehicle system 1 of the third embodiment is the same as the vehicle system 1 of the first embodiment except that the vehicle system 1 of the third embodiment includes a HCU 20b instead of the HCU 20. The HCU 20b is the same as the HCU 20 of the first embodiment except that a configuration of the HCU 20*b* associated with the control of the display performed by the HUD 220 is partly different from that of the HCU 20.

A description will be given on the assumption that the third embodiment is applied to a case where the virtual image representing the target information source is displayed in superimposed relation on the front view during manual driving. Accordingly, in the third embodiment, it may also be possible to use a configuration in which the vehicle system 1 does not include the automated driving ECU 6, and the recognition of the vehicle-running environment is performed by another ECU such as the HCU 20*b*.

<Schematic Configuration of HCU 20*b*>

Figure 11:
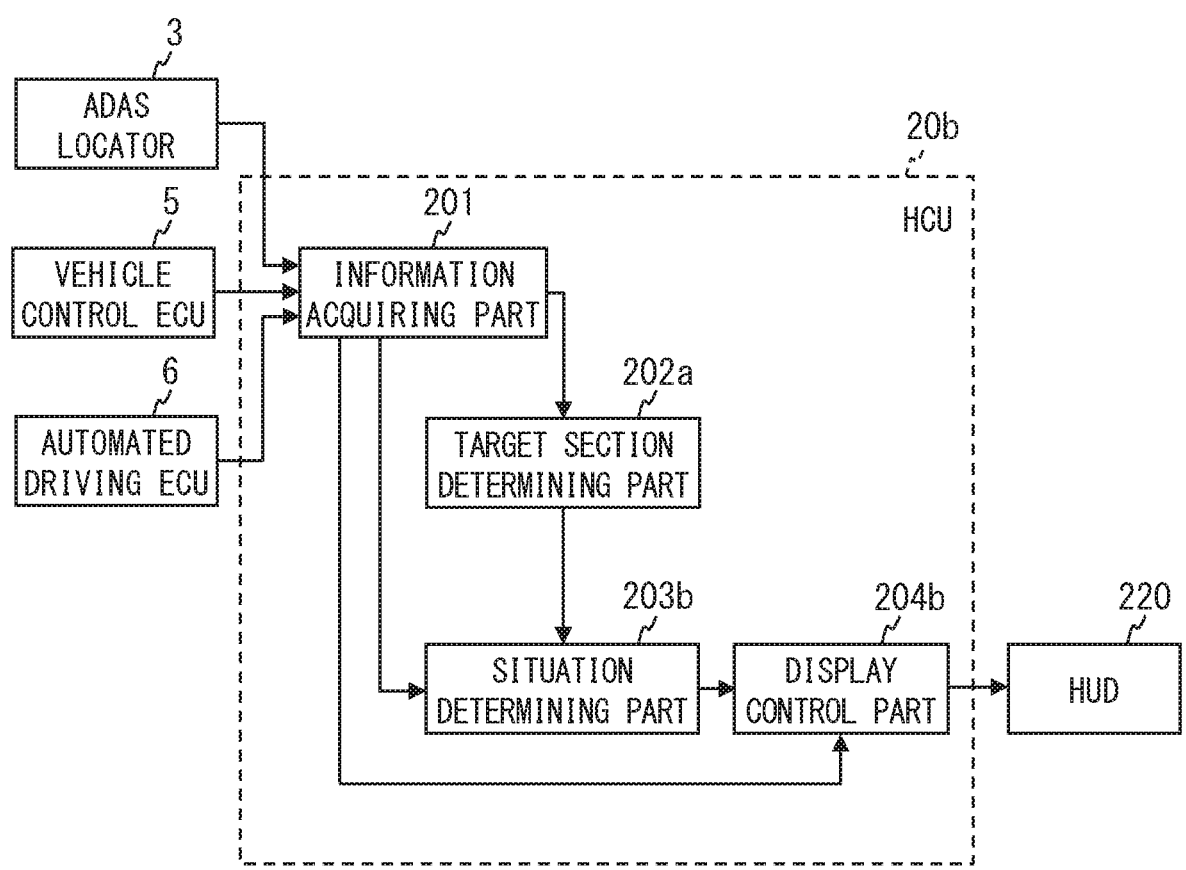
FIG. 11 is a diagram illustrating an example of the schematic configuration of the HCU.

Referring to FIG. 11, a description will be given of a schematic configuration of the HCU 20*b*. As shown in FIG. 11, the HCU 20*b* includes, as a functional block, the information acquiring part 201, a target section determining part 202*a*, a situation determining part 203*b*, and a display control part 204*b* in association with the control of the display performed by the HUD 220. The HCU 20*b* also corresponds to the vehicle display control device.

Similarly to the target section determining part 202*a* of the HCU 20*a*, the target section determining part 202*a* determines whether or not the road on which the host vehicle is running is in the target section in which the target information source is present. The target information source can be set to any sign or to any marking showing a regulation. Examples of the target information source include a road sign, a road marking, or the like which prohibits or specifies a specific traffic method such as a temporary halt, no parking, no entry, or a maximum speed.

The situation determining part 203*b* determines whether or not the target information source ahead of the host vehicle on the route is in a situation (hereinafter referred to as oversight situation) in which the target information source is presumed to be overlooked by the driver. Whether or not the target information source is in the oversight situation corresponds to the host vehicle situation. For example, when the host vehicle shows the sign of not following the regulation shown by the target information source, the situation determining part 203*b* determines that the target information source is in the oversight situation. On the other hand, when the host vehicle does not show the sign of not following the regulation shown by the target information source, the situation determining part 203*b* determines that the target information source is not in the oversight situation.

The sign of not following the regulation shown by the target information source may appropriately be detected from the running state of the host vehicle. By way of example, based on the detection signals from the individual sensors which are output from the vehicle control ECU 5, the sign of not following the regulation shown by the target information source may appropriately be detected. When the target information source is a sign showing no parking, based on the detection signal from the wheel speed sensor, the speed of the host vehicle which becomes equal to or less than the predetermined speed may also be detected as the sign of not following the regulation. Alternatively, based on a signal from the hazard switch, the turning ON of the hazard switch may also be detected as the sign of not following the regulation. When the target information source is a sign or a marking showing a maximum speed, based on the detection signal from the wheel speed sensor, the speed of the host vehicle exceeding the maximum speed regulated by the target information source may appropriately be detected as the sign of not following the regulation. Besides, when the target information source is a sign showing no entry, a turn signal from the turn signal switch 7 which shows a change of direction into a road provided with the target information source may appropriately be detected as the sign of not following the regulation.

When the vehicle system 1 includes a camera which captures an image of the driver's face, the situation determining part 203*b* may also determine whether or not the target information source is in the oversight situation using the following configuration. Specifically, the situation determining part 203*b* may appropriately detect an eye direction of the driver from the face image and determine, when a time period during which the driver is looking at the target information source is less than a set time period, that the target information source is in the situation in which the target information source is presumed to be overlooked by the driver. It may also be possible to use a configuration in which e.g., a DSM (Driver Status Monitor) other than the HCU 20*b* detects the eye direction of the driver from the face image.

When the situation determining part 203*b* determines that the target information source ahead of the host vehicle on the route is in the oversight situation in which the target information source is presumed to be overlooked by the driver, the display control part 204*b* causes the HUD 220 to display the virtual image representing the target information source in superimposed relation on the front view. In the third embodiment also, the display of the virtual image representing the target information source is referred to as the target information source display. On the other hand, when the situation determining part 203*b* determines that the target information source is not in the oversight situation, the display control part 204*b* prevents the HUD 220 from performing the target information source display.

The display control part 204*b* may also be configured to cause the HUD 220 to perform the target information source display in superimposed relation on a position at which the target information source is present in the front view. However, to cause the driver to notice the target information source which is presumed to be overlooked, the target information source display is preferably performed in superimposed relation on a position other than the position at which the target information source is present in the front view. It is also preferred that the display control part 204*b* changes a display mode in which the virtual image of the target information source is displayed in superimposed relation on the front view based on a level of urgency of causing the host vehicle to follow the regulation shown by the target information source. The display control part 204*b* may be configured appropriately to handle a target information source showing a regulation related to a place such that, as a distance to the target information source is shorter, the regulation shown by the target information source has a higher level of urgency. The display control part 204*b* may also be configured appropriately to handle a target information source showing a regulation related to a maximum speed such that, as a gap between the speed of the host vehicle and the maximum speed regulated by the target information source tends to be larger, the regulation shown by the target information source has a higher level of urgency.

Figure 12:
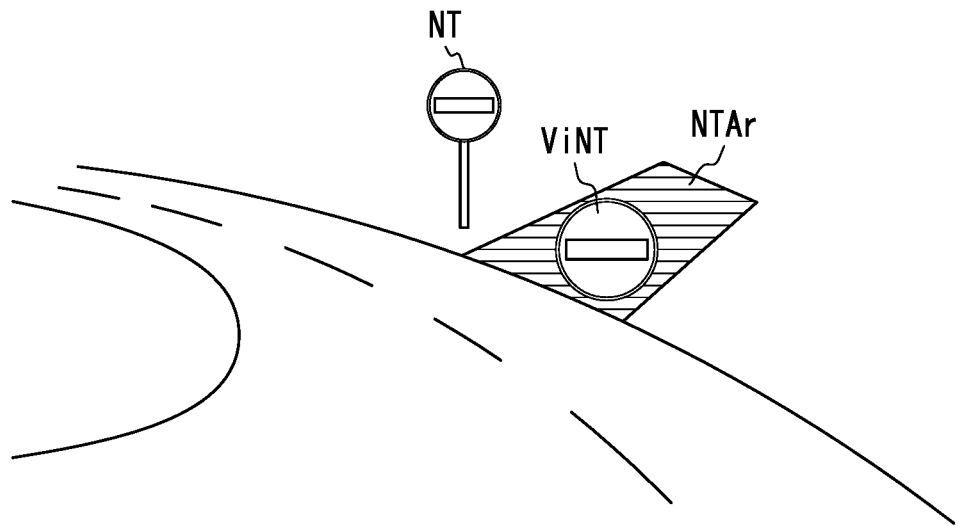
FIG. 12 is a diagram for explaining a specific example of the target information source display in the display control part.

A description is given herein of a specific example of the target information source display caused by the display control part 204*b*. For example, when the situation determining part 203*b* determines that a sign (see NT in FIG. 12) showing no entry is in the oversight situation in which the sign is presumed to be overlooked by the driver, as shown in FIG. 12, the display control part 204b may appropriately cause the HUD 220 to perform the target information source display (see ViNT in FIG. 12) in superimposed relation on a road in the front view into which entry is prohibited. As the target information source display, the virtual image (see ViNT in FIG. 12) of the image of the sign showing no entry may appropriately be displayed. Note that the display control part 204b may also be configured to cause the HUD 220 to display, in addition to the virtual image of the image of the sign showing no entry, a virtual image (see NTAr in FIG. 12) representing a no-entry area in superimposed relation on an area corresponding to the road in the front view into which entry is prohibited. To allow the driver to easily recognize that the virtual image representing the no-entry area indicates prohibition, the virtual image representing the no-entry area preferably has a color, a pattern, or the like different from that of the lane guidance display. By way of example, the virtual image representing the no-entry area may appropriately have a pattern or the like similar to that of a zebra zone. Also, to allow the driver to easily recognize that the virtual image representing the no-entry area indicates prohibition, the display control part 204b may also be configured to cause the HUD 220 to display a three-dimensional object as the virtual image.

Figure 13:
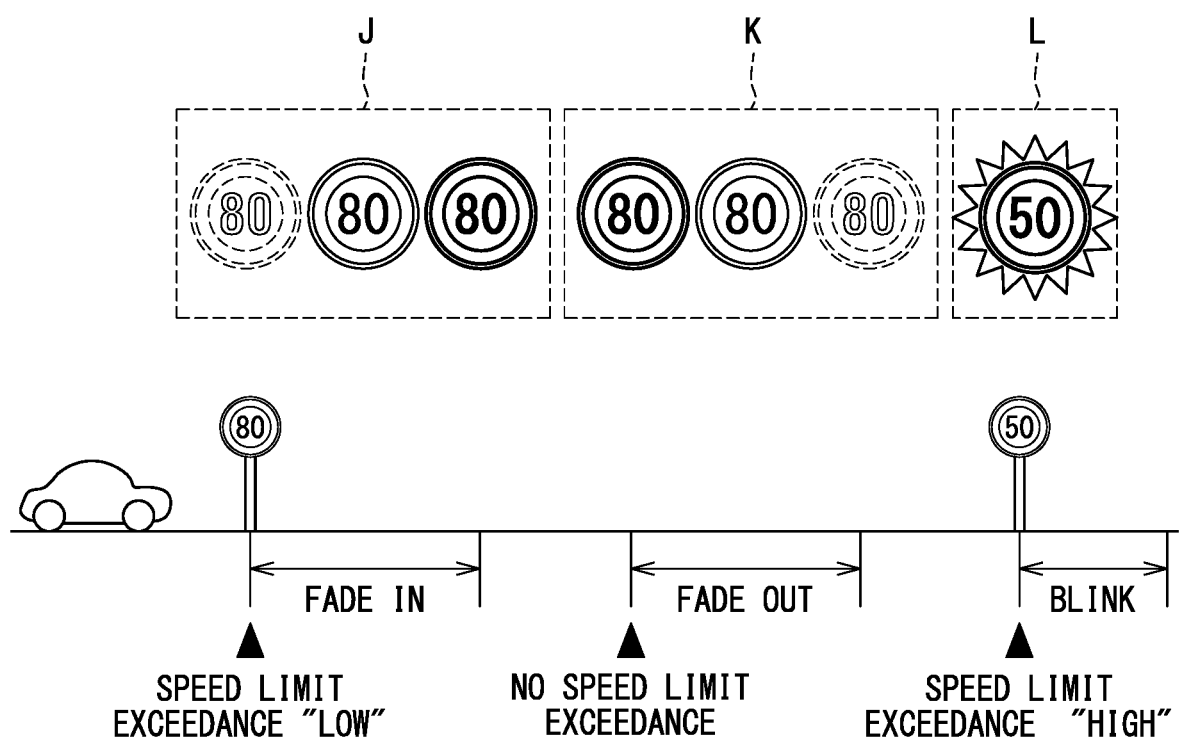
FIG. 13 is a diagram for explaining a specific example of changing of the target information source display in accordance with an urgency level in the display control part.

Besides, when the situation determining part 203b determines that a sign showing a maximum speed is in the oversight situation in which the sign showing the maximum speed is presumed to be overlooked by the driver, as the target information source display, a virtual image of an image of the sign showing the maximum speed may appropriately be displayed in superimposed relation on the front view. When the virtual image of the image of the sign showing the maximum speed is displayed in superimposed relation, the display mode may appropriately be changed based on a level of urgency of causing the host vehicle to follow the regulation shown by the target information source. Referring to FIG. 13, a description is given herein of an example. By way of example, referring to FIG. 13, the description is given of a case where, after entering a section in which the maximum speed is 80 km while running in a state in which speed limit exceedance is on a "LOW" level less than a threshold, the host vehicle shifts into a state without the speed limit exceedance, and then moves from the section in which the maximum speed is 80 km into a section in which the maximum speed is 50 km while running in a state in which the speed limit exceedance is on a "HIGH" level equal to or more than the threshold. The threshold mentioned herein is an arbitrarily settable value.

When the speed limit exceedance is on the "LOW" level, the driver may consciously maintain a low speed in consideration of the sign showing the maximum speed. Accordingly, the display control part 204b fades in the target information source display (see J in FIG. 13) such that the driver is less likely to feel annoyed. Subsequently, when the host vehicle shifts from the state with the speed limit exceedance to the state without the speed limit exceedance, to protect the driver from incidentally seeing a sudden display change and feeling annoyed, the display control part 204b fades out the target information source display (see K in FIG. 13). On the other hand, when the speed limit exceedance is on the "HIGH" level, the possibility is high that the driver has overlooked the sign showing the maximum speed. Accordingly, the display control part 204b gives priority to causing the driver to notice the sign and causes the target information source display to blink (see L in FIG. 13). By thus changing the display mode based on the level of urgency of causing the host vehicle to follow the regulation shown by the target information source, it is possible to assist driving, while reducing the annoyance felt by the driver as necessary.

<Virtual Image Display Control Related Process in HCU 20b>

Figure 14:
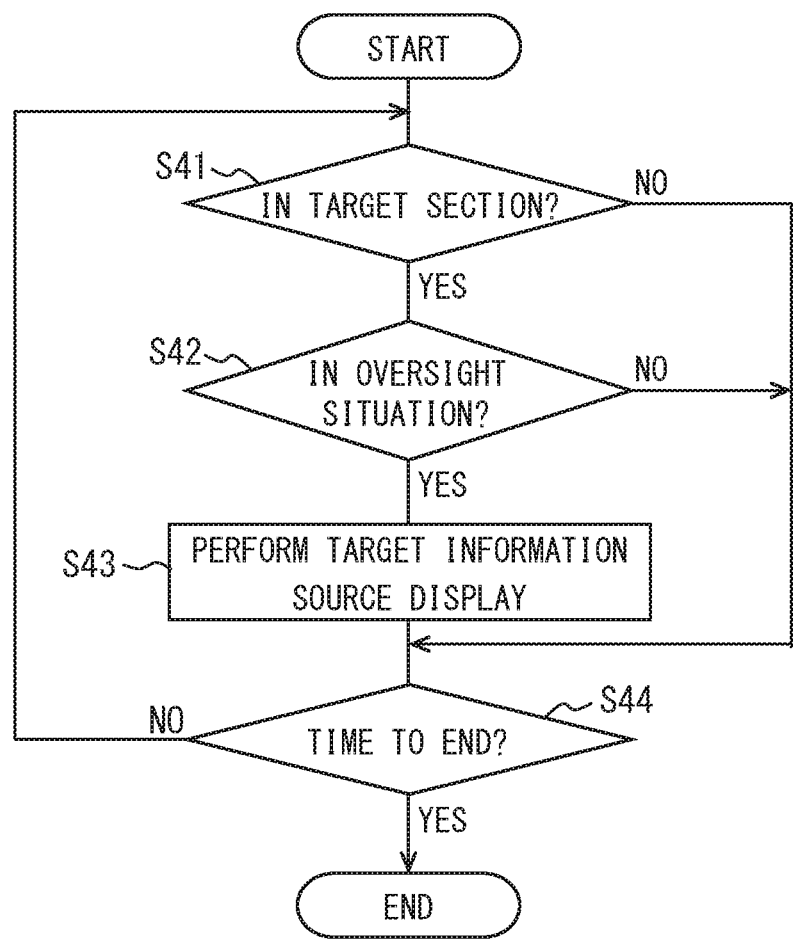
FIG. 14 is a flow chart illustrating an example of the flow of the virtual image display control related process in the HCU.

Subsequently, using a flow chart of FIG. 14, a description will be given of an example of a flow of the virtual image display control related process in the HCU 20b. In the flow chart of FIG. 14 also, in the same manner as in the flow chart of FIG. 5, the virtual image display control related process may appropriately be configured to be started when the power source of the HUD 220 is turned on and the function of the HUD 220 is turned on.

First, in S41, the target section determining part 202a determines whether or not the road on which the host vehicle is running is in the target section. When the target section determining part 202a determines that the road on which the host vehicle is running is in the target section (YES in S41), the virtual image display control related process proceeds to S42. On the other hand, when the target section determining part 202a determines that the road on which the host vehicle is running is not in the target section (NO in S41), the virtual image display control related process proceeds to S44.

In S42, the situation determining part 203b determines whether or not the target information source ahead of the host vehicle on the route is in the oversight situation in which the target information source is presumed to be overlooked by the driver. When the situation determining part 203b determines that the target information source is in the oversight situation (YES in S42), the virtual image display control related process proceeds to S43. On the other hand, when the situation determining part 203b determines that the target information source is not in the oversight situation (NO in S42), the virtual image display control related process proceeds to S44.

In S43, the display control part 204b causes the HUD 220 to perform the target information source display in superimposed relation on the front view, and the virtual image display control related process proceeds to S44. The target information source display may appropriately be ended when a time period elapsed from the start of the target information source display reaches a set time period or ended when the sign of not following the regulation shown by the target information source is no longer detected.

In S44, when it is time to end the virtual image display control related process (YES in S44), the virtual image display control related process is ended. On the other hand, when it is not time to end the virtual image display control related process (NO in S44), the virtual image display control related process returns to S41 to be repeated.

<Summarization of Third Embodiment>

With the configuration of the third embodiment, the virtual image representing the target information source is not constantly displayed, but is displayed when it is determined that the target information source ahead of the host vehicle on the route is in the situation in which the target information source is presumed to be overlooked by the driver. This allows the virtual image representing the target information source to be displayed at a time when the display of the virtual image representing the target information source is presumed to be useful to the driver and also allows a reduction in the annoyance felt by the driver compared to the case where the target information source is allowed to be constantly displayed.

(Seventh Modification)

Each of the second and third modifications has shown the configuration which limits the target section in which the target information source display is to be performed. However, a configuration to be used is not necessarily limited thereto. For example, it may also be possible to use a configuration which does not limit the target section in which the target information source display is to be performed. In this case, it is appropriate to use a configuration in which the HCU 20a or 20b does not include the target section determining part 202a. When the configuration which does not limit the target section in which the target information source display is to be performed is used, the HCU 20a or 20b may appropriately be configured to cause the situation determining part 203a or 203b to sequentially make determination in the virtual image display control related process.

(Eighth Modification)

In each of the first to third embodiments described above, as the configuration which limits the superimposed display of the virtual image on the front view, such as the lane guidance display or the target information source display, the configuration is shown which limits the superimposed display by preventing the superimposed display from being performed. However, a configuration to be used is not necessarily be limited thereto. For example, it may also be possible to use a configuration which limits the superimposed display by reducing a brightness of the superimposed display. Even when the superimposed display is limited by reducing the brightness of the superimposed display, due to the reduced brightness of the superimposed display, the superimposed display is less likely to attract notice of the driver. Therefore, it is possible to reduce the annoyance felt by the driver.

Fourth Embodiment

The fifth modification described above has shown the configuration in which, depending on whether or not a gradient change of the road on which the host vehicle is running is equal to or more than a gradient change value at which the lane guidance display is predicted to be so deviated from the projection area as to presumably give an odd feeling to the driver, it is selectively determined whether or not the superimposed display on the front view is to be stopped. However, a configuration to be used is not necessarily limited thereto. For example, it may also be possible to use a configuration (hereinafter referred to as a fourth embodiment) in which, e.g., depending on whether or not the gradient change of the road on which the host vehicle is running is equal to or more than a gradient change value which is presumed to form a blind spot visually unrecognizable by the driver on an anterior road surface of the road on which the host vehicle is running, it is selectively determined whether or not the superimposed display on the front view, such as the lane guidance, is to be stopped. The following will describe the fourth embodiment.

<Schematic Configuration of Vehicle System 1c>

Figure 15:
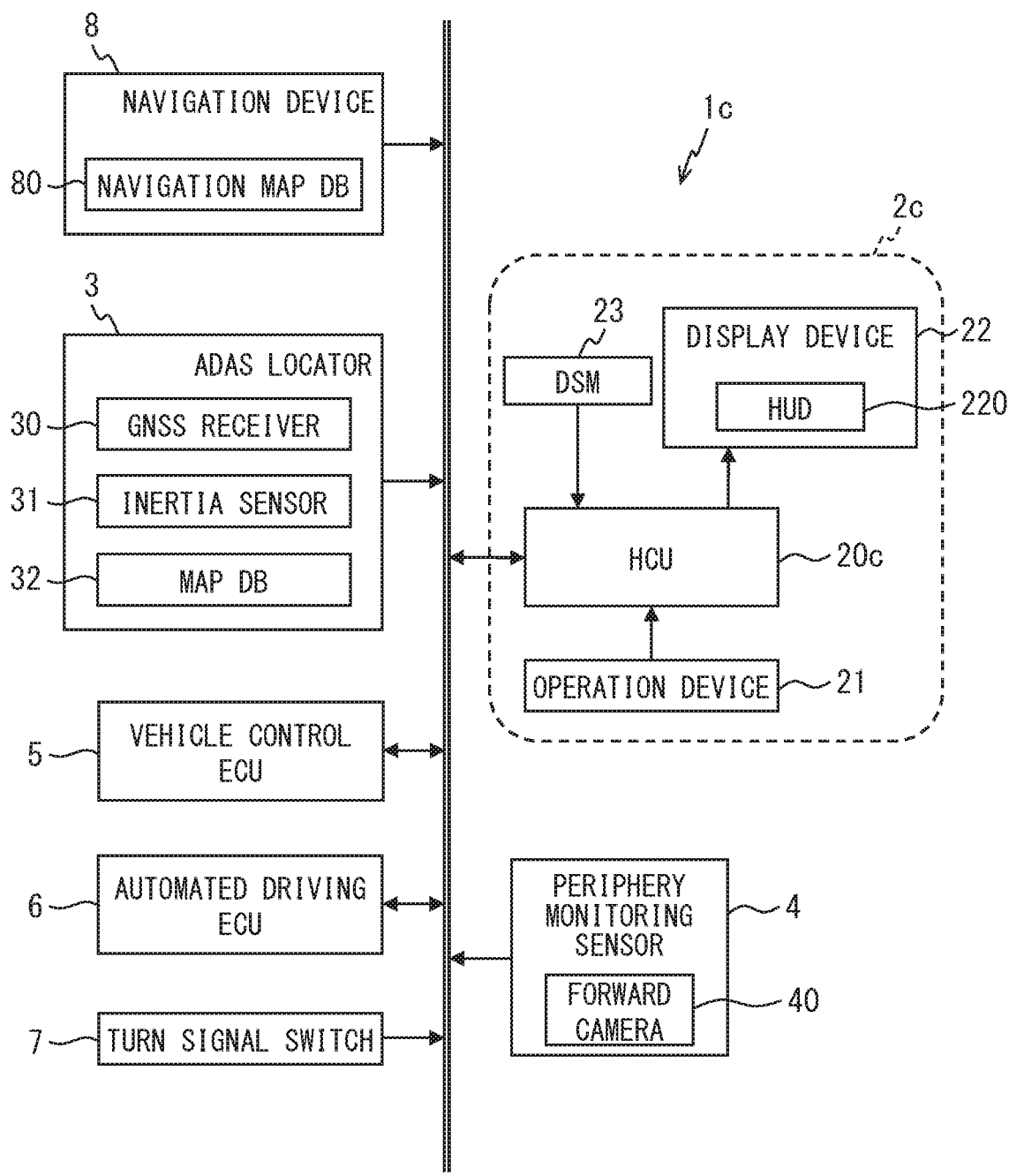
FIG. 15 is a diagram illustrating an example of the schematic configuration of the vehicle system.

A vehicle system 1c of the fourth embodiment is the same as the vehicle system 1 of the first embodiment except that the vehicle system 1c includes a HMI system 2c, instead of the HMI system 2, and includes a navigation device 8. As shown in FIG. 15, the HMI system 2c includes a HCU 20c, the operation device 21, the display device 22, and a DSM (Driver Status Monitor) 23. The HMI system 2c is the same as the HMI system 2 of the first embodiment except that the HMI system 2c includes the HCU 20c, instead of the HCU 20, and includes the DSM 23.

The DSM 23 includes a near-infrared light source, a near-infrared camera, a control unit which controls the near-infrared light source and the near-infrared camera, and the like. The DSM 23 is disposed in, e.g., an upper surface of the instrument panel, while being in a position in which the near-infrared camera faces the driver seat of the host vehicle. The DSM 23 causes the near-infrared camera to photograph a head portion of the driver illuminated with near-infrared light from the near-infrared light source. An image captured by the near-infrared camera is subjected to image analysis performed by the control unit. The control unit detects eyes in the captured image by an image recognition process and specifies an eye point based on the positions of the detected eyes. The eye point is a position of each of the eyes of the driver occupying the driver seat. The control unit may appropriately be configured to specify the eye point as, e.g., coordinates in a three-dimensional space using, as an origin, the vehicle position of the host vehicle located by the ADAS locator 3. The control unit may appropriately be configured to specify the coordinates of the eye point based on a correspondence relationship between a position defined in advance in the image captured by the near-infrared camera and the position in the three-dimensional space.

The DSM 23 may also be configured to detect the eye direction of the driver. The DSM 23 may appropriately be configured to detect the eye direction of the driver as follows. First, the control unit detects portions of a face such as a facial contour, the eyes, a nose, and a mouth in the captured image by the image recognition process to detect a face orientation of the driver based on relative positional relationships among the individual portions. The control unit also detects pupils and corneal reflexes in the captured image by the image recognition process and detects the eye direction based on the detected face orientation and on a positional relationship between the detected pupils and the detected corneal reflexes.

The navigation device 8 includes a navigation map DB 80, retrieves a route satisfying a condition such as giving priority to a time period required to reach a set destination or giving priority to a distance to the set destination, and gives routing assistance in accordance with the retrieved route. The navigation map DB 80 may appropriately be a nonvolatile memory storing map data such as link data, segment data, node data, and road shapes. When the navigation map DB 80 is used, it is appropriate to use a configuration in which, e.g., the map DB 32 of the ADAS locator 3 does not store the data stored in the navigation map DB 80 such as the link data, the segment data, the node data, and the road shapes, but stores a three-dimensional map including the road shapes and a group of characteristic feature points of structures. It may also be possible to use a configuration in which, for the long/middle-term driving schedule in the automated driving ECU 6, the route retrieved by the navigation device 8 is used. Note that it may also be possible to apply a configuration including the navigation device 8 to each of the first to third embodiments.

<Schematic Configuration of HCU 20c>

Figure 16:
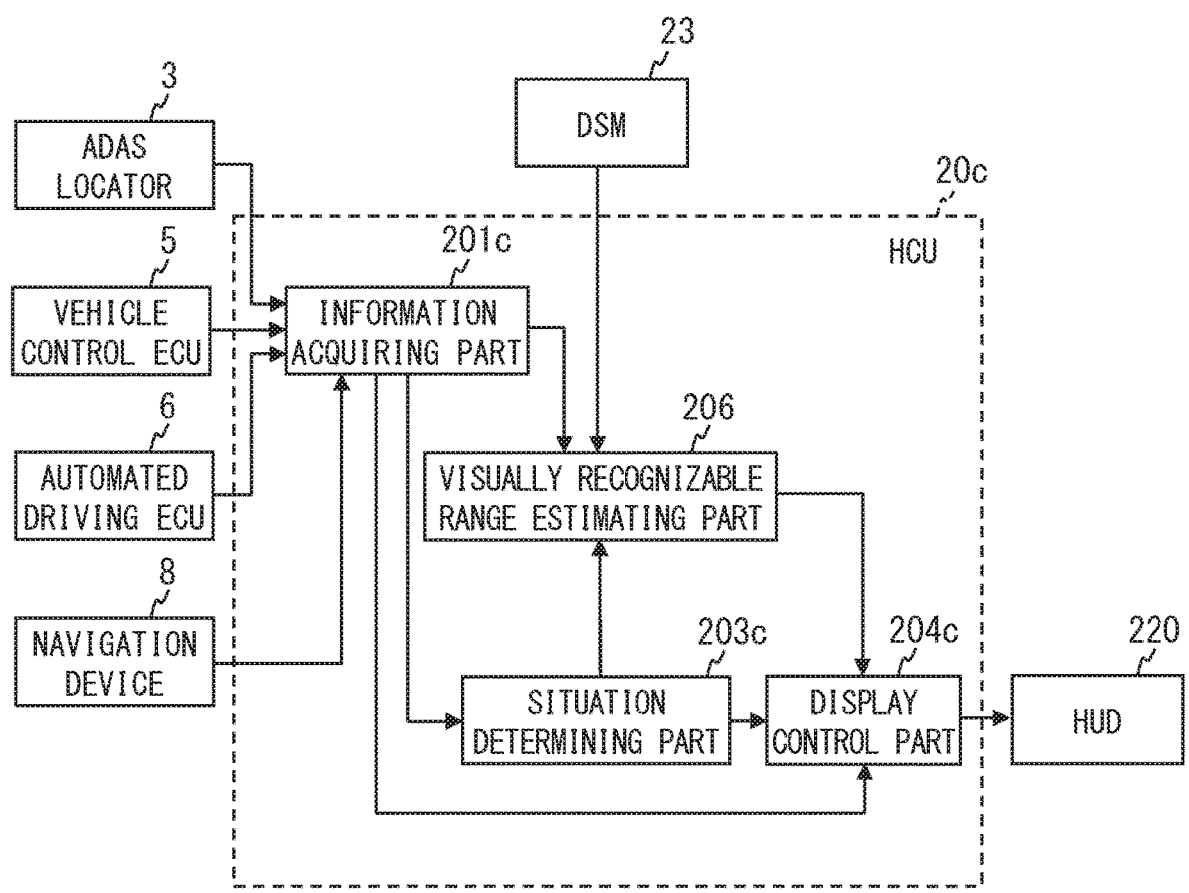
FIG. 16 is a diagram illustrating an example of the schematic configuration of the HCU.

Subsequently, referring to FIG. 16, a description will be given of a schematic configuration of the HCU 20c. As shown in FIG. 16, the HCU 20c includes, as a functional block, an information acquiring part 201c, a situation determining part 203c, a display control part 204c, and a visually recognizable range estimating part 206 in association with the control of the display performed by the HUD 220. The HCU 20c also corresponds to the vehicle display control device. The HCU 20c is the same as the HCU 20 of the first embodiment except that the HCU 20c does not include the target section determining part 202, includes the visually recognizable range estimating part 206, and includes the information acquiring part 201c, the situation determining part 203c, and the display control part 204c instead of the information acquiring part 201, the situation determining part 203, and the display control part 204.

The information acquiring part 201c is the same as the information acquiring part 201 of the first embodiment except that the information acquiring part 201c acquires the map data and the route information each output from the navigation device 8. The situation determining part 203c determines a gradient change of a longitudinal gradient of the road on which the host vehicle is running ahead of the host vehicle. The road on which the host vehicle is running ahead of the host vehicle may appropriately be in, e.g., a section subsequent to the section corresponding to the current vehicle position. The section may be a link-based section, a segment-based section, or a section demarcated on another basis. The situation determining part 203c may determine the gradient change ahead of the host vehicle from the vehicle-running environment recognized by the automated driving ECU 6 or may also determine the gradient change ahead of the host vehicle from the vehicle position and the map data each output from the ADAS locator 3, the navigation device 8, and the like.

The situation determining part 203c determines whether or not a gradient decrease rate ahead of the host vehicle as the gradient change ahead of the host vehicle is equal to or more than a threshold. The gradient decrease rate ahead of the host vehicle corresponds to the host vehicle situation. It is assumed herein that an ascending gradient value is positive, a descending gradient value is negative, and a horizontal gradient value is zero. The threshold mentioned herein may appropriately be a value of the gradient decrease rate which is presumed to form the blind spot visually unrecognizable by the driver on the anterior road surface of the road on which the host vehicle is running. The threshold may appropriately be estimated by simulation or determined by experimental driving. A situation in which a gradient change forms the blind spot visually unrecognizable by the driver on the anterior road surface of the road on which the host vehicle is running indicates a situation in which, e.g., while the host vehicle is driving up a hill, the road surface ahead of a top of the hill is hidden and unseen from the driver or the like.

The visually recognizable range estimating part 206 estimates the range of the road surface ahead of the host vehicle which is visually recognizable by the driver of the host vehicle. Specifically, based on the eye point of the driver of the host vehicle, which is acquired from the DSM 23, and on a road structure of the road on which the host vehicle is running, which is acquired by the information acquiring part 201c, the range of the road surface visually recognizable by the driver of the host vehicle is estimated. The road structure of the road on which the host vehicle is running, which is acquired by the information acquiring part 201c, may appropriately be, e.g., a road structure represented by a three-dimensional map.

Figure 17:
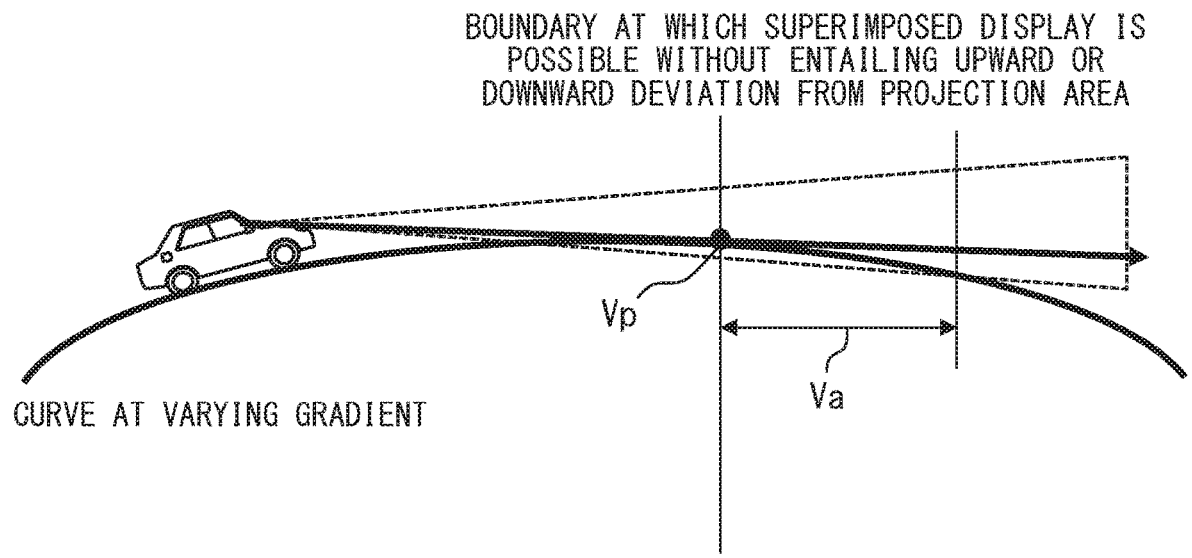
FIG. 17 is a diagram for explaining an example of a method of estimating a road surface range which is visually recognizable by a driver of the host vehicle.

Referring to FIG. 17, a description is given herein of an example of a method of estimating the range of the road surface visually recognizable by the driver of the host vehicle. By way of example, the visually recognizable range estimating part 206 replaces the coordinates of the eye point of the driver with a position on the three-dimensional map, extends a straight line from the coordinates of the eye point on the three-dimensional map in the eye direction of the driver, and assumes that a point at which the extended straight line crosses the road surface is a vanishing point (Vp in FIG. 17). It may also be possible to use a configuration which uses, as the eye direction of the driver, an eye direction based on the assumption that the driver is facing the front or a configuration which uses, as the eye direction of the driver, the eye direction detected by the DSM 23. Then, the visually recognizable range estimating part 206 estimates the road surface extending from the host vehicle to the vanishing point to be the range of the road surface visually recognizable by the driver of the host vehicle. Note that the road surface beyond the vanishing point is estimated to be outside the range of the road surface visually recognizable by the driver of the host vehicle even when the road surface beyond the vanishing point is in a range (Va in FIG. 17) which is not upwardly or downwardly deviated from the projection area in which the displayed image is projected.

When the situation determining part 203c determines that the gradient decrease rate ahead of the host vehicle is less than the threshold, the display control part 204c causes the HUD 220 to perform the lane guidance display showing the inner range of the lane scheduled to be followed in the front view along the shape of the lane, similarly to the display control part 204 of the first embodiment. The lane scheduled to be followed may appropriately be specified according to the route suggested by the navigation device 8.

Figure 18:
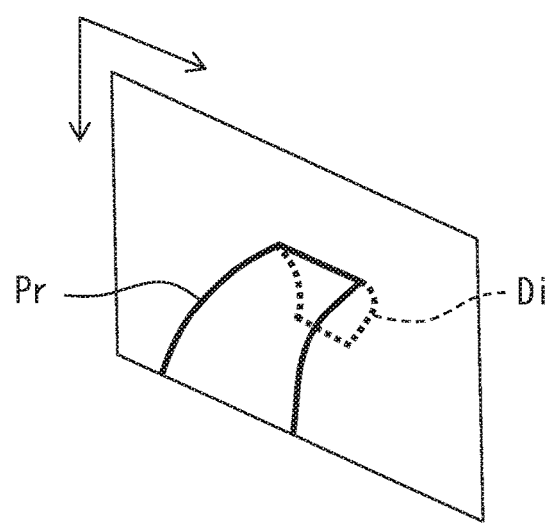
FIG. 18 is a diagram for explaining an example of limiting of a range of lane guidance display.

On the other hand, when the situation determining part 203c determines that the gradient decrease rate ahead of the host vehicle is equal to or more than the threshold, the display control part 204c limits the lane guidance display on the front view. Specifically, when the situation determining part 203c determines that the gradient decrease rate ahead of the host vehicle is equal to or more than the threshold, the display control part 204c limits a range of the lane guidance display to within the range estimated by the visually recognizable range estimating part 206 to be the range of the road surface visually recognizable by the driver of the host vehicle. A description will be given thereof with reference to FIG. 18. The display control part 204c controls the lane guidance display including the range (Pr in FIG. 18) of the road surface estimated to be visually recognizable by the driver and a range (Di in FIG. 18) of the road surface estimated to be visually unrecognizable by the driver such that only the range Pr is displayed in superimposed relation. Note that the display control part 204c prevents the lane guidance display on the road surface outside the range estimated to be the range of the road surface visually recognizable by the driver even when the lane guidance display thereon is not upwardly or downwardly deviated from the projection area.

This is because, when there is a section in which the gradient decreases ahead of the host vehicle on the route, depending on the degree of the gradient decrease, a blind spot visually unrecognizable by the driver is formed on the road surface at a descending gradient and, when the lane guidance display is performed with respect even to the road surface corresponding to the blind spot, the odd feeling given by the lane guidance display to the driver increases to possibly cause the driver to feel annoyed. By contrast, in the fourth embodiment, when it is determined that the gradient decrease rate ahead of the host vehicle is equal to or more than the threshold, the range of the lane guidance display is limited to within the range estimated to be the range of the road surface visually recognizable by the driver to be able to reduce such annoyance.

Note that, in the configuration shown herein, the range of the road surface visually recognizable by the driver of the host vehicle is estimated by determining the vanishing point. However, a configuration to be used is not necessarily limited thereto. For example, it may also be possible to use a configuration in which, e.g., a road surface shape is acquired as surface information from the three-dimensional map and, using hidden surface removing treatment used as a 3D graphic technique, the range of the road surface visually recognizable by the driver of the host vehicle is estimated. When the hidden surface removing treatment is used, it is appropriate to use the eye point as a specific point of view, obtain, from all the pixels in the lane guidance display, a hidden surface unseen from the eye point in accordance with, e.g., a Z-buffer method (Z-buffer algorithm), and thus estimate the range of the road surface visually recognizable by the driver of the host vehicle.

When causing the HUD 220 to perform display during the automated driving, the display control part 204c may also be configured to cause the virtual image of the route direction icon showing the direction of the route scheduled to be followed by the host vehicle either in a case where the lane guidance display is allowed to be performed or in a case where the lane guidance display is not allowed to be performed. The direction of the route scheduled to be followed by the host vehicle may appropriately be specified according to the route suggested by the navigation device 8, the running schedules planned by the automated driving ECU 6, or the like.

<Virtual Image Display Control Related Process in HCU 20c>

Figure 19:
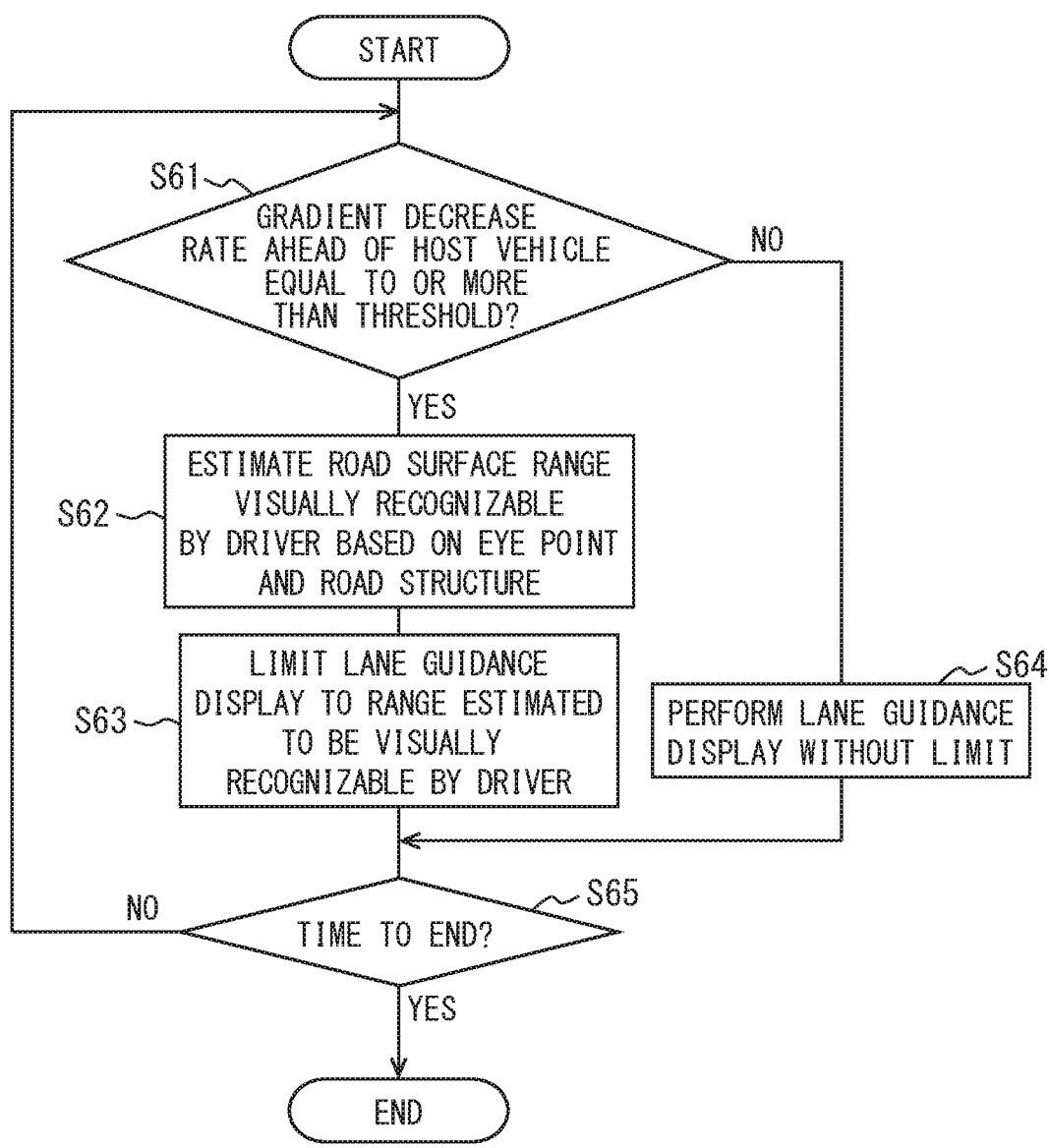
FIG. 19 is a flow chart illustrating an example of the flow of the virtual image display control related process in the HCU.

Subsequently, using a flow chart of FIG. 19, a description will be given of an example of a flow of the virtual image display control related process in the HCU 20c. In the flow chart of FIG. 19 also, in the same manner as in the flow chart of FIG. 5, the virtual image display control related process may appropriately be configured to be started when the power source of the HUD 220 is turned on and the function of the HUD 220 is turned on.

First, in S61, the situation determining part 203c determines whether or not the gradient decrease rate ahead of the host vehicle is equal to or more than the threshold. When the situation determining part 203c determines that the gradient decrease rate is equal to or more than the threshold (YES in S61), the virtual image display control related process proceeds to S62. On the other hand, when the situation determining part 203c determines that the gradient decrease rate is less than the threshold (NO in S61), the virtual image display control related process proceeds to S64.

In S62, based on the eye point of the driver of the host vehicle and on the road structure of the road on which the host vehicle is running, the visually recognizable range estimating part 206 estimates the range of the road surface ahead of the host vehicle which is visually recognizable by the driver of the vehicle.

In S63, the display control part 204c causes the HUD 220 to limit the range of the lane guidance display to within the range of the road surface estimated by the visually recognizable range estimating part 206 to be visually recognizable by the driver of the host vehicle and perform the lane guidance display, and the virtual image display control related process proceeds to S65. On the other hand, in S64, the display control part 204c causes the HUD 220 to perform the lane guidance display without the limit described above, and the virtual image display control related process proceeds to S65.

In S65, when it is time to end the virtual image display control related process (YES in S65), the virtual image display control related process is ended. On the other hand, when it is not time to end the virtual image display control related process (NO in S65), the virtual image display control related process returns to S61 to be repeated. Examples of the time to end the virtual image display control related process include a time when the power switch of the host vehicle is turned off and a time when the function of the HUD 220 is turned off.

<Summarization of Fourth Embodiment>

With the configuration of the fourth embodiment, when the gradient decrease rate ahead of the host vehicle is equal to or more than the threshold, the range of the lane guidance display is limited to within the range estimated by the visually recognizable range estimating part 206 to be the range of the road surface visually recognizable by the driver of the host vehicle. Thus, it is possible to reduce the annoyance felt by the driver due to the lane guidance display performed with respect even to the road surface corresponding to the blind spot.

(Ninth Modification)

In the configuration shown in the fourth embodiment, the eye point of the driver of the host vehicle is specified by the DSM 23. However, a configuration to be used is not necessarily limited thereto. For example, it may also be possible to use a configuration in which the eye point of the driver is specified by another method. By way of example, it may also be possible to use a configuration in which, using the fact that the tendency of the eye point of the driver differs according to different profiles of the driver such as a body height, the eye point is estimated based on a profile of the driver such as the body height. By way of example, the following will describe a case using the body height as the profile of the driver.

It is assumed that, in the nonvolatile memory of the HUC 20c, correspondence relationships obtained by associating representative values of the eye point with body heights are stored. As the representative values mentioned herein, a mode value, an average value, an intermediate value, and the like can be used. It is appropriate to specify, based on the correspondence relationships, the eye point in accordance with the body height of the driver received from the driver via the operation device 21 or the like and estimate the specified eye point to be the eye point of the driver.

Fifth Embodiment

In the configuration shown in the fourth embodiment, when the gradient decrease rate ahead of the host vehicle is equal to or more than the threshold, the range of the lane guidance display is limited to within the range estimated by the visually recognizable range estimating part 206 to be the range of the road surface visually recognizable by the driver of the host vehicle. However, a configuration to be used is not necessarily limited thereto. For example, it may also be possible to use a configuration (hereinafter referred to as a fifth embodiment) in which, when the gradient decrease rate ahead of the host vehicle is equal to or more than the threshold, the lane guidance display is limited by preventing the lane guidance display from being performed. The following will describe the fifth embodiment.

<Schematic Configuration of Vehicle System 1d>

Figure 20:
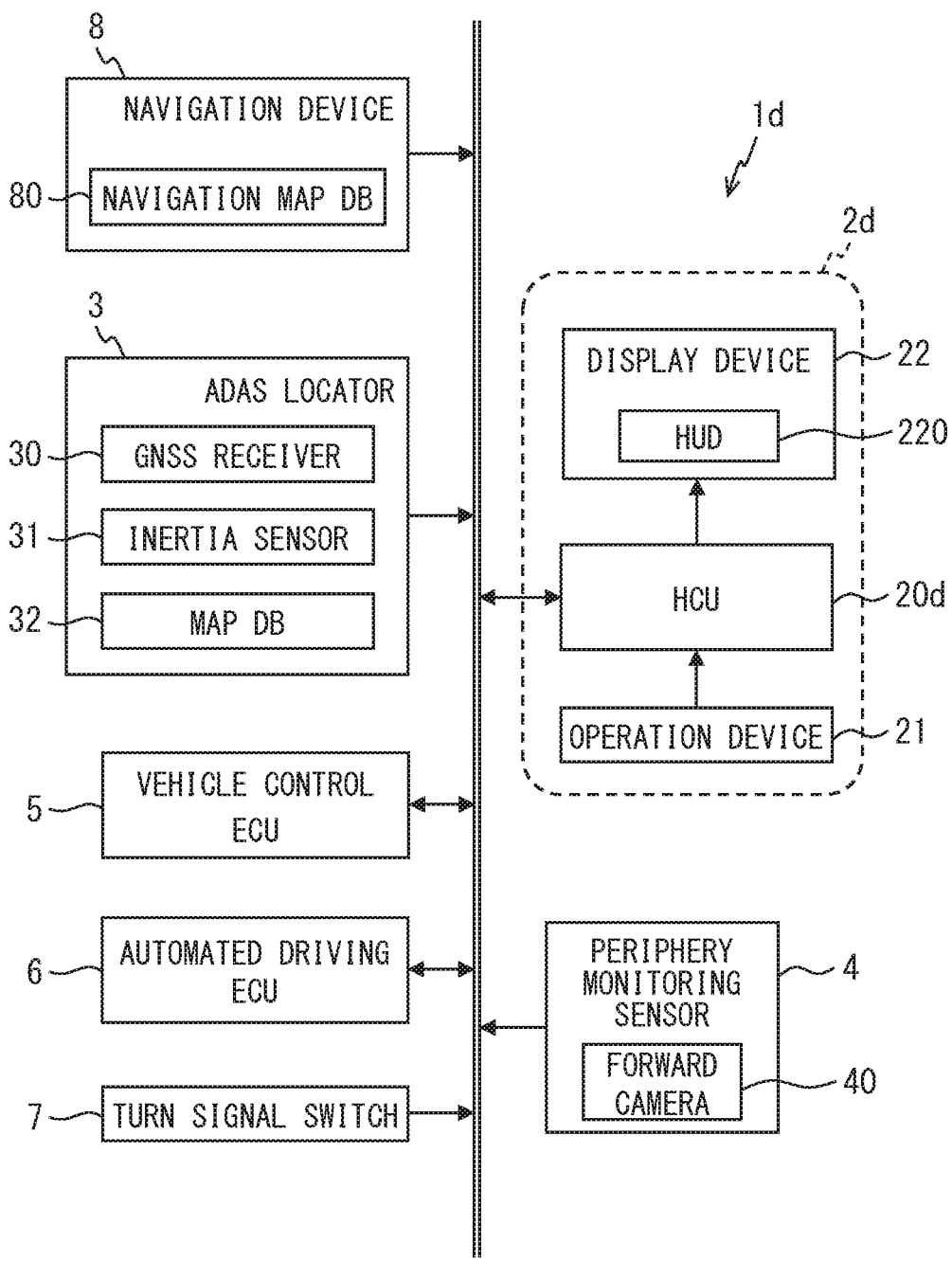
FIG. 20 is a diagram illustrating an example of the schematic configuration of the vehicle system.

A vehicle system 1d of the fifth embodiment is the same as the vehicle system 1c of the fourth embodiment except that the vehicle system 1d includes a HMI system 2d, instead of the HMI system 2c. As shown in FIG. 20, the HMI system 2d includes a HCU 20d, the operation device 21, and the display device 22. The HMI system 2d is the same as the HMI system 2c of the fourth embodiment except that the HMI system 2d includes the HCU 20d, instead of the HCU 20c, and does not include the DSM 23.

<Schematic Configuration of HCU 20*d*>

Figure 21:
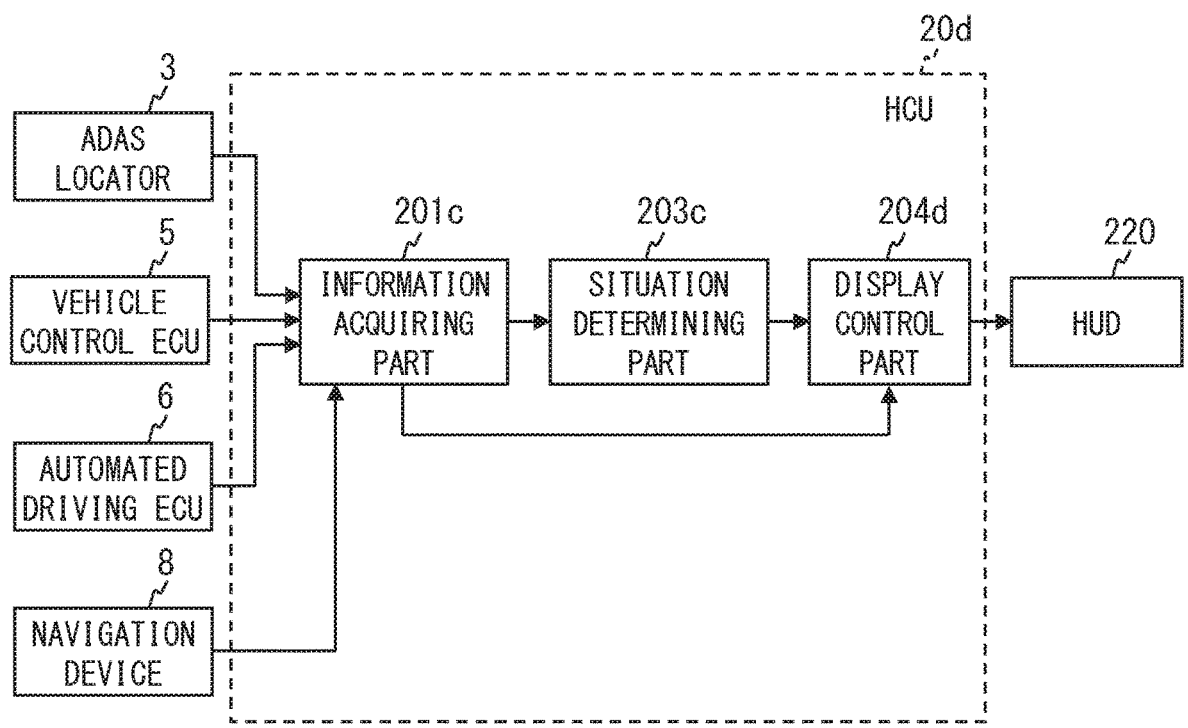
FIG. 21 is a diagram illustrating an example of the schematic configuration of the HCU.

Subsequently, referring to FIG. 21, a description will be given of a schematic configuration of the HCU 20*d*. As shown in FIG. 21, the HCU 20*d* includes, as a functional block, the information acquiring part 201*c*, the situation determining part 203*c*, and a display control part 204*d* in association with the control of the display performed by the HUD 220. The HCU 20*d* also corresponds to the vehicle display control device. The HCU 20*d* is the same as the HCU 20*c* of the fourth embodiment except that the HCU 20*d* does not include the visually recognizable range estimating part 206 and includes the display control part 204*d* instead of the display control part 204*c*.

When the situation determining part 203*c* determines that the gradient decrease rate ahead of the host vehicle is less than the threshold, the display control part 204*d* causes the HUD 220 to perform the lane guidance display showing the inner range of the lane scheduled to be followed in the front view along the shape of the lane, similarly to the display control part 204*c* of the fourth embodiment.

On the other hand, when the situation determining part 203*c* determines that the gradient decrease rate ahead of the host vehicle is equal to or more than the threshold, the display control part 204*d* prevents the HUD 220 from performing the lane guidance display on the front view. When causing the HUD 220 to perform display during the automated driving, the display control part 204*d* may appropriately be configured to cause the virtual image of the route direction icon showing the direction of the route scheduled to be followed by the host vehicle either in a case where the lane guidance display is allowed to be performed or in a case where the lane guidance display is not allowed to be performed, in the same manner as described in the fourth embodiment. Consequently, even when the gradient decrease rate ahead of the host vehicle is equal to or more than the threshold and the lane guidance display is not allowed to be performed, the route direction icon display is continued. This allows the driver to recognize that the system of the host vehicle is running in the scheduled route direction and feel secure about the system status.

Note that it may also be possible to use a configuration in which the route direction icon display is applied also to a case where the HUD 220 is caused to perform display during manual driving. In this case, even when the gradient decrease rate ahead of the host vehicle is equal to or more than the threshold and the lane guidance display is not allowed to be performed, the route direction icon display is continued. This allows the driver to recognize that the system of the host vehicle is operating and feel secure about the system status.

<Summarization of Fifth Embodiment>

With the configuration of the fifth embodiment, when the gradient decrease rate ahead of the host vehicle is equal to or more than the threshold, by preventing the lane guidance display from being performed, it is possible to reduce the annoyance felt by the driver due to the lane guidance display performed with respect even to the road surface corresponding to the blind spot.

(Tenth Modification)

In the configurations shown in the fourth and fifth embodiments, the display control part 204*c* or 204*d* selectively determines, with respect to the lane guidance display showing the inner range of the lane scheduled to be followed in the front view along the shape of the lane, whether or not the superimposed display on the front view is to be limited based on whether or not the gradient decrease rate ahead of the host vehicle is equal to or more than the threshold. However, a configuration to be used is not necessarily limited thereto. For example, as described in the first modification, it may also be possible to use a configuration to be applied to guidance display along the shape of the lane scheduled to be followed in the front view, which is other than the lane guidance display.

(Eleventh Modification)

In the configurations shown in the fourth and fifth embodiments, when the display control part 204*c* or 204*d* causes the HUD 220 to perform display during the automated driving, the HUD 220 is caused to constantly perform the route direction icon display. However, a configuration to be used is not necessarily limited thereto. For example, it may also be possible to use a configuration in which the display control part 204*c* or 204*d* causes the HUD 220 to perform the route direction icon display only when the lane guidance display is not allowed to be performed. Note that the same applies also to the ninth modification in which the guidance display is performed instead of the lane guidance display.

(Twelfth Modification)

In the fourth and fifth embodiments described above, the example applied to the case where the host vehicle performs automated driving has been described by way of example. However, a configuration to be used is not necessarily limited thereto. For example, it may also be possible to use a configuration to be applied to a case where the host vehicle is manually driven. Alternatively, the configuration may also be such that the host vehicle does not have an automated driving function. In this case, the configuration may appropriately be such that the vehicle system 1*c* or 1*d* does not include the automated driving ECU 6, and the recognition of the vehicle-running environment is performed by another ECU or performed based on map data of the route suggested by the navigation device 8.

(Thirteenth Modification)

In the configurations shown in the fourth and fifth embodiments, the target section in which the lane guidance display is to be performed is not limited, but a configuration to be used is not necessarily limited thereto. For example, it may also be possible to use a configuration in which the target section in which the lane guidance display is to be performed is limited.

(Fourteenth Modification)

In the fifth embodiment, as the configuration which limits the superimposed display of the virtual image on the front view such as the lane guidance display, the configuration is shown which limits the superimposed display by preventing the superimposed display from being performed. However, a configuration to be used is not necessarily limited thereto. For example, it may also be possible to use a configuration which reduces the brightness of the superimposed display to limit the superimposed display. Even when the brightness of the superimposed display is reduced to limit the superimposed display, due to the reduced brightness of the super imposed display, the superimposed display is less likely to attract notice of the driver. Therefore, it is possible to reduce the annoyance felt by the driver.

(Fifteenth Modification)

Alternatively, the display control part 204, 204*a*, 204*b*, or 204*c* may also be configured to cause the HUD 220 to display a virtual image representing navigation information such as information showing the running condition of the host vehicle such as a vehicle speed or engine revolutions, information showing an operating state of the automated driving function, routing assistance information, or traffic jam information.

While the present disclosure has been described with reference to embodiments thereof, it is to be understood that the disclosure is not limited to the embodiments and modifications. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A vehicle display control device for controlling display performed by a head-up display for a vehicle, the head-up display being configured to project an image on a projection member to cause a virtual image to be displayed in superimposed relation on a front view of the vehicle, the vehicle display control device comprising:
   a situation determining part configured to determine a host vehicle situation as a road structure of a road on which a host vehicle is running; and
   a display control part configured to control to limit or not to limit a superimposed display of the virtual image with respect to a target object on which the virtual image is to be displayed in superimposed relation according to the host vehicle situation determined by the situation determining part,
   wherein the host vehicle situation determined by the situation determining part includes at least one of a curvature and a gradient change of the road on which the host vehicle is running, and
   wherein the display control part limits, with respect to a lane scheduled to be followed by the host vehicle which serves as the target object on which the virtual image is to be displayed in superimposed relation, the superimposed display of the virtual image along a shape of the lane on the front view according to the at least one of the curvature and the gradient change of the road on which the host vehicle is running, which is determined by the situation determining part.

2. The vehicle display control device according to claim 1,
   wherein the display control part limits the superimposed display by selectively allowing or prohibiting, according to the host vehicle situation determined by the situation determining part, the superimposed display of the virtual image.

3. The vehicle display control device according to claim 1,
   wherein the host vehicle situation determined by the situation determining part is at least the curvature of the road on which the host vehicle is running,
   wherein the display control part does not limit, with respect to the lane scheduled to be followed by the host vehicle which serves as the target object on which the virtual image is to be displayed in superimposed relation, the superimposed display of the virtual image along the shape of the lane on an inside of the lane in the front view when the curvature of the road on which the host vehicle is running is less than a threshold, and
   wherein the display control part limits, with respect to the lane scheduled to be followed by the host vehicle which serves as the target object on which the virtual image is to be displayed in superimposed relation, the superimposed display of the virtual image on the inside of the lane when the curvature of the road on which the host vehicle is running is equal to or more than the threshold.

4. The vehicle display control device according to claim 1,
   wherein the host vehicle situation determined by the situation determining part is at least the curvature of the road on which the host vehicle is running,
   wherein the display control part does not limit, with respect to the lane scheduled to be followed by the host vehicle which serves as the target object on which the virtual image is to be displayed in superimposed relation, the superimposed display of the virtual image representing an inner range of the lane along the shape of the lane on an inside of the lane when the curvature of the road on which the host vehicle is running is less than a threshold, and
   wherein the display control part limits, with respect to the lane scheduled to be followed by the host vehicle which serves as the target object on which the virtual image is to be displayed in superimposed relation, the superimposed display of the virtual image on the inside of the lane in the front view when the curvature of the road on which the host vehicle is running is equal to or more than the threshold.

5. The vehicle display control device according to claim 1,
   wherein the display control part assumes that each of a lane in a section in which the host vehicle is about to turn and a lane in a section in which the host vehicle is required to turn is the lane which serves as the target object on which the virtual image is to be displayed in superimposed relation.

6. The vehicle display control device according to claim 1,
   wherein the host vehicle situation determined by the situation determining part is at least a gradient of the road on which the host vehicle is running ahead of the host vehicle, and
   wherein the display control part does not limit, with respect to the lane scheduled to be followed by the host vehicle which serves as the target object on which the virtual image is to be displayed in superimposed relation, the superimposed display of the virtual image along the shape of the lane on an inside of the lane in the front view when a gradient decrease rate ahead of the host vehicle is less than a threshold, and
   wherein the display control part limits, with respect to the lane scheduled to be followed by the host vehicle which serves as the target object on which the virtual image is to be displayed in superimposed relation, the superimposed display of the virtual image on the inside of the lane when the gradient decrease rate ahead of the host vehicle is equal to or more than the threshold.

7. The vehicle display control device according to claim 6,
   wherein, when the superimposed display of the virtual image along the shape of the lane to be followed by the host vehicle is not deviated from a range of the projection member, and when the gradient decrease rate ahead of the host vehicle is equal to or more than the threshold, the display control part limits the superimposed display of the virtual image along the shape of the lane to be followed by the host vehicle on the front view.

8. The vehicle display control device according to claim 6, further comprising:
   a virtually recognizable range estimating part that is configured to estimate, based on an eye point of the driver of the host vehicle and on the road structure of the road on which the host vehicle is running, a range of a road surface ahead of the host vehicle which is virtually recognizable by the driver, and wherein, when the gradient decrease rate ahead of the host vehicle is equal to or more than the threshold, the display control part limits a range of the superimposed display of the virtual image along the shape of the lane to be followed by the host vehicle on the front view to within a range estimated by the virtually recognizable range estimating part to be the range of the road surface visually recognizable by the driver.

9. The vehicle display control device according to claim 6, wherein, when the gradient decrease rate ahead of the host vehicle is equal to or more than the threshold, the display control part limits the superimposed display of the virtual image by preventing the virtual image along the shape of the lane to be followed by the host vehicle from being displayed in superimposed relation on the front view.

10. The vehicle display control device according to claim 1, wherein, when the display control part limits, with respect to the lane scheduled to be followed by the host vehicle which serves as the target object on which the virtual image is to be displayed in superimposed relation, the superimposed display of the virtual image along the shape of the lane, the display control part causes a virtual image of an icon showing a direction of a route scheduled to be followed by the host vehicle to be displayed in superimposed relation on an inside of the lane in the front view, the virtual image of the icon being of a type different from that of the virtual image along the shape of the lane.

11. The vehicle display control device according to claim 10, wherein the host vehicle situation determined by the situation determining part is at least the curvature of the road on which the host vehicle is running, and wherein the display control part shifts, in a direction in which the host vehicle turns, a position at which the virtual image of the icon is to be displayed in superimposed relation as the curvature of the road on which the host vehicle is running increases.

12. The vehicle display control device according to claim 11, wherein, when a range in which the head-up display can project the image on the projection member is limited, in shifting the position at which the virtual image of the icon is to be displayed in superimposed relation, the display control part shifts the position at which the virtual image of the icon is to be displayed such that the position at which the virtual image of the icon is to be displayed falls within the range.

13. The vehicle display control device according to claim 1, wherein the display control part limits, with respect to the lane scheduled to be followed by the host vehicle which serves as the target object on which the virtual image is to be displayed in superimposed relation, the superimposed display of the virtual image along the shape of the lane based on at least one of the curvature and the gradient change of the road on which the host vehicle is running, which is determined by the situation determining part, and wherein the display control part prevents, with respect to a lane which does not serve as the target object on which the virtual image is to be displayed in superimposed relation, the superimposed display of the virtual image along the shape of the lane.

14. A vehicle display control device for controlling display performed by a head-up display for a vehicle, the head-up display being configured to project an image on a projection member to cause a virtual image to be displayed in superimposed relation on a front view of the vehicle, the vehicle display control device comprising a processor configured to determine a host vehicle situation as a road structure of a road on which a host vehicle is running; and to control to limit or not to limit a superimposed display of the virtual image with respect to a target object on which the virtual image is to be displayed in superimposed relation according to the host vehicle situation determined, wherein the host vehicle situation determined includes at least one of a curvature and a gradient change of the road on which the host vehicle is running, and wherein the processor limits, with respect to a lane scheduled to be followed by the host vehicle which serves as the target object on which the virtual image is to be displayed in superimposed relation, the superimposed display of the virtual image along a shape of the lane on the front view according to the at least one of the curvature and the gradient change of the road on which the host vehicle is running.

\* \* \* \* \*